(12) United States Patent
Wang et al.

(10) Patent No.: US 6,862,382 B2
(45) Date of Patent: *Mar. 1, 2005

(54) OPTICAL LUMINESCENT DISPLAY DEVICE

(75) Inventors: Ting Wang, Princeton, NJ (US); Allan Schweitzer, San Mateo, CA (US); Maximilan Ott, Pennington, NJ (US)

(73) Assignee: NEC Corporation, Tokyo (JP)

( * ) Notice: Subject to any disclaimer, the term of this patent is extended or adjusted under 35 U.S.C. 154(b) by 291 days.

This patent is subject to a terminal disclaimer.

(21) Appl. No.: 09/853,575

(22) Filed: May 14, 2001

(65) Prior Publication Data

US 2002/0025113 A1 Feb. 28, 2002

Related U.S. Application Data

(63) Continuation of application No. 09/246,145, filed on Feb. 8, 1999, now Pat. No. 6,307,987.
(60) Provisional application No. 60/098,769, filed on Sep. 1, 1998.

(51) Int. Cl.[7] ................................................. G02B 6/00
(52) U.S. Cl. ............................ 385/31; 385/47; 385/901
(58) Field of Search ............................... 385/15, 16, 31, 385/39, 42, 47, 48, 49, 51, 115, 147, 901; 362/551, 554, 556, 559

(56) References Cited

U.S. PATENT DOCUMENTS

| 4,047,033 | A | 9/1977 | Malmberg et al. |
| 4,231,640 | A | 11/1980 | Funada et al. |
| 4,335,936 | A | 6/1982 | Nonomura et al. |

(List continued on next page.)

FOREIGN PATENT DOCUMENTS

| EP | 21308 | 1/1981 | |
| EP | 0507447 A2 | 10/1992 | |
| EP | 0533236 A1 | 3/1993 | |
| EP | 533236 A1 | 3/1993 | |
| EP | 0594089 A1 | 4/1994 | |
| WO | WO 90/02349 A1 | 3/1990 | |
| WO | WO 95/27920 A1 | 10/1995 | |
| WO | 95/27920 | 10/1995 | |
| WO | WO 95/27920 | * 10/1995 | ......... G02F/1/1335 |
| WO | WO 0021308 a1 | 4/2000 | |

OTHER PUBLICATIONS

J. Gasiot et al., Nanosecond Infrared Laser Stimulation of Luminescence in Rate–Earth Doped Sulfides, App. Phys. Lett., vol. 40, No. 5 (Mar. 1982) pp376–378.

(List continued on next page.)

*Primary Examiner*—Akm Enayet Ullah
*Assistant Examiner*—M. R. Connelly-Cushwa
(74) *Attorney, Agent, or Firm*—Sughrue Mion, PLLC

(57) ABSTRACT

A luminescent material, such as phosphor, is radiated by energy propagated from the side of an optical fiber, causing the luminescent material to emit visible light The luminescent material can be of a coincidentally-excited type, requiring the absorption of two wavelengths of radiation to emit visible light. In such a case, two side-emitting optical fibers can be used, with each optical fiber providing one of the needed radiation wavelengths. One embodiment of the invention involves a matrix of optical fibers forming an optical display panel made using coincidentally-excited phosphors. Side-emitting optical fibers are used to simultaneously stimulate a phosphor pixel located between the two fibers, allowing matrix addressing of each pixel individually. The optical display panel is constructed of only optical components. Another embodiment involves an optical switch with coincidentally-excited luminescent material. One radiation is provided by a side-emitting optical fiber. To activate the switch, a second radiation is provided by a laser diode.

3 Claims, 25 Drawing Sheets

U.S. PATENT DOCUMENTS

| | | | |
|---|---|---|---|
| 4,346,961 A | | 8/1982 | Porter |
| 4,833,542 A | | 5/1989 | Hara et al. |
| 5,037,172 A | | 8/1991 | Hekman et al. |
| 5,432,876 A | | 7/1995 | Appeldorn et al. |
| 5,659,643 A | * | 8/1997 | Appeldorn et al. ......... 362/551 |
| 5,673,344 A | | 9/1997 | Li et al. |
| 5,757,989 A | | 5/1998 | Yoshimura et al. |
| 5,835,173 A | | 11/1998 | Inbar et al. |
| 6,307,987 B1 | * | 10/2001 | Wang et al. ............. 250/484.4 |

OTHER PUBLICATIONS

D.T. Brower, I.K. Lloyd, Investigation of the Effect of Host Composition on the Photoluminescent Properties of Sr/sub xc Ba/sub 1−x/S Doped With Eu and Sm, Journal of Materials Research vol. 10, No. 1, p. 211–15.

"Phosphor Handbook," *Phosphor Research Society*, Shigeo Shionoya et al. Ed., pp. 224–225.

V.V. Motur, V.I. Zimenko, "Luminescence Characteristics of the Materials for theDevices Representation of Information", SPIE—vol. 2949, p. 88–92.

* cited by examiner

OPTICAL LUMINESCENT DISPLAY DEVICE

CROSS REFERENCE TO RELATED APPLICATIONS

This is a continuation of application Ser. No. 09/246,145, filed Feb. 8, 1999 now U.S. Pat. No. 6,307,987, the disclosure of which is incorporated herein by reference, which is based on and claims priority from U.S. Provisional Patent Application No. 60/098,769 filed on Sep. 1, 1998, which is incorporated herein by reference in its entirety.

BACKGROUND

Field of the Invention

The present invention relates generally to the use of a luminescent compound radiated by energy propagated from the side of an optical fiber. One embodiment of the invention involves a display matrix made from coincidentally-excited phosphors. Another embodiment involves an optical switch.

Desktop computer monitors, laptop computers, televisions, and a wide variety of electronic devices incorporate displays. These displays are often of a cathode ray tube (CRT) or liquid crystal display construction. An example of a liquid crystal display panel is described by Funada, et al. in U.S. Pat. No. 4,231,640. The conventional construction of displays has typically involved high-voltage components and the emission of electromagnetic radiation and electromagnetic interference (EMI) from the display panel. Size and weight characteristics of conventional displays often make portability difficult or inconvenient. Also, durability of the display can be troublesome, due to the high number of electronic parts, or alignment required of various components.

There is currently no display technology that can provide a very thin, light and durable display panel that produces no electromagnetic interference or noise. Even a phosphor-based display has typically involved a complex construction involving variety of transistors, pixel drivers, electrodes and line or column electrical wire.

There are some display technologies that involve optical fibers adapted to emit visible light from the side of the optical fibers. However, these technologies are limited in that each optical fiber is either "on" or "off," causing an entire row of notches to emit the visible light transmitted through the fiber simultaneously. Each row of notches is also limited to the same color of visible light transmitted through the common optical fiber. None of these technologies combine luminescent materials with side-emitting optical fibers.

U.S. Pat. No. 5,432,876 discloses an optical fiber having a light emitting region to propagate light from an optical fiber in a preselected direction. One embodiment of '876 involves mounting of optical fibers to a panel so as to form a substantially parallel array. In one embodiment, a liquid crystal shutter array (LCS) is formed in front of the substantially parallel array so as to block unwanted notch emissions from view. However, '876 only teaches the redirection of light from the notch of an optical fiber and not the illumination of a luminescent material.

U.S. Pat. No. 5,659,643 discloses a notched fiber array illumination device. '643 is similarly limited to only teaching the redirection of light from an optical fiber, but does teach a Fresnel lens or other beam turning device can be used to further redirect light emitted from the notch of an optical fiber.

SUMMARY

The present invention transmits radiation through a side-emitting optical fiber to radiate a luminescent material and produce visible light. This allows for an optical luminescent display device to be constructed without electronic components.

A second embodiment of the invention is an optical switch. The optical switch involves radiation provided from within a side emitting optical fiber and, upon activation of the optical switch, a second radiation provided by a laser diode or infrared LED.

Another embodiment of the invention involves a display panel made from a matrix of optical fibers capable of coincidentally-radiating pixels of luminescent material. This allows for matrix-addressing of individual pixels within a display panel.

It is therefore an object of the invention to provide a display panel that is entirely optical, thereby providing a rugged device, able to operate where electronic devices can not be used, including high temperature environments.

It is a further object of the invention to provide a display panel that can be separate from the light source providing excitation.

It is a further object of the invention to provide a display with no high-voltage, no electromagnetic radiation and no EMI from the display panel.

It is a further object of the invention to provide a matrix of a plurality of all-optical pixels, having no electronics in the display panel.

It is a further object of the invention to provide simple construction of a display panel.

BRIEF DESCRIPTION OF THE DRAWINGS

The foregoing and other features, objects, and advantages of the invention will be better understood by reading the following description in conjunction with the drawings, in which.

DETAILED DESCRIPTION

Figure 1:
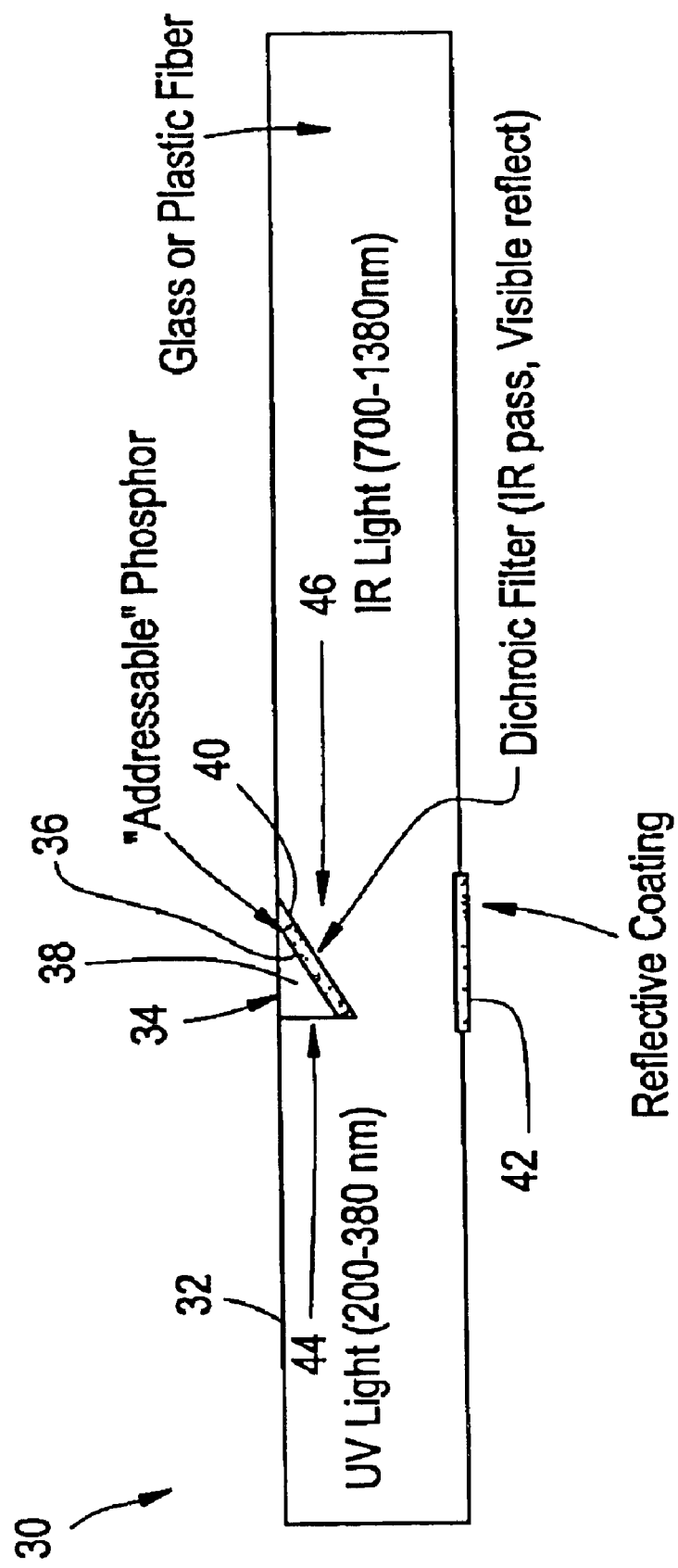
FIG. 1 illustrates an optical luminescent display device of optical side-emitting fiber with luminescent material embedded in the notch.

The various features of the invention will now be described with respect to the figures, in which like parts are identified with the same reference characters.

The structure shown in FIG. 1 will now be described. The optical luminescent display device 30 is comprised of an optical fiber 32 that includes a notch 34. The optical fiber 32 is made of an optically transmissive substance, such as plastic or glass. Virtually any diameter of optical fiber 32 can be used. If glass optical fiber is used, a diameter of approximately 125 microns to 1 mm is typical.

The notch 34 contains a luminescent material 36, such as a phosphor or fluorescent material. The notch 34 may be left open or filled in with a filling material 38. The filling material 38 could be a typical optical filler substance known in the art, or it could be a luminescent material. Filling in the notch results in a stronger structure and enhanced optical properties. The depth of the notch can vary. If multiple notches are provided on a single optical fiber and a light, e.g. radiation, source is provided from only one side, the depth of each notch 34 can be increased as the notches are located further from the light source. This allows for equal illumination of each notch, even though some notches are further from the light source. The notch 34 is shown in the shape of a right triangle, but can be formed at a variety of angles. Also, the notch 34 can be a narrow slit, just wide enough for the luminescent material 36 to be deposited. Although only one notch is shown, a plurality of notches may be formed in the optical fiber 32. The notches do not necessarily need to be oriented in the same direction; they may be formed to face multiple directions.

If, as is preferred, phosphor is used as the luminescent material 36, the phosphor thickness is approximately typically 50 to 100 microns. The luminescent material 36 may be mounted as shown in FIG. 1, or on the outside edge of a notch 34 containing filling material 38, or may be a coating large enough to cover both the outside edge of the optical fiber 32 and fill in the notch 34, or transversally-opposite side of the optical fiber 32 from the notch 34, similar to the location of the reflective coating 42 shown in FIG. 1. The luminescent material 36 can also be formed as a sheet, providing for easier application to multiple optical fibers.

Ideally, a dichroic filter 40 is located between the luminescent material 36 and the optical fiber 32. The dichroic filter 40 allows infrared (IR) light to pass, but reflects visible light. Also, a reflective coating 42 may be mounted on the optical fiber 32 transversally opposite from the notch 34. The reflective coating 42 reflects all types of radiation. Both IR and visible light are reflected by reflective coating 42 as shown in FIG. 1.

The operation of the optical luminescent display device 30 is as follows. Radiation is provided through the optical fiber 32 so that it communicates with the luminescent material 36, causing the luminescent material 36 to emit visible light. Visible light is then projected from the luminescent material 36. If present, the dichroic filter 40 and the reflective coating 42 each serve to enhance the visible light emitting from the luminescent material 36 so as to brighten the display. The dichroic filter 40 reflects visible light and therefore reflects the visible light emitted by the luminescent material 36 outward and helps to keep the visible light out of the optical fiber 32. The reflective coating 42 reflects radiation passing through the optical fiber 32, such as IR light, ultraviolet (UV) light, or visible light that may be deflected downward by the notch 34. As shown in FIG. 1, the reflective coating 42 reflects any radiation, such as IR light back in the direction of the notch 34 to enhance the amount of radiation reaching the luminescent material 36. Visible light emitted by the luminescent material is similarly reflected so as to enhance the amount of visible light emitted in the direction of the viewer.

Phosphorescence is the emission of light from certain inorganic materials following excitation by photons, electrons, or high-energy radiation. Absorption of the incident radiation occurs because valence-band electrons in the material are excited to higher-energy states. In normal materials and in fluorescent substances the excited electron returns quickly to the ground state, and emission of light decays very soon after cessation of the incident, i.e. exciting, radiation. In phosphorescent materials, in contrast, the decay of the excited state is prolonged, often because the excited electrons are trapped at acceptor states just below the conduction band.

The radiation provided through the optical fiber 32 may be IR light, UV light, visible light, or any radiation or energy that serves to cause the luminescent material 36 to emit visible light. In one embodiment, the luminescent material 36 is double illumination, i.e. co-incident, luminescent material and does not emit visible light until two wavelengths of light communicate with it. As shown in FIG. 1, UV light 44 is radiated from one direction and IR light 46 is radiated from another direction.

The UV light 44 is typically of a wavelength approximately of 200 to 380 nm. The IR light 46 is typically of a wavelength approximately of 700 to 1380 nm. Optionally, the direction from which the light is radiated may be reversed or radiated from the same side. Other luminescent material 36, which is single illumination luminescent material, only requires one wavelength of light to communicate with it to cause it to emit visible light.

The operation of an example of a phosphor, such as SmEu, is as follows. Eu++ has a $4f$ ground state just above the valence band of the lattice, and a $5d$ excited state just below the conduction band. Blue or UV light, depending on the composition of the phosphor, excites the Eu++ ion to the $4d$ state. Sm++ creates traps just below the conduction band in these materials. By a charge-transfer mechanism, the excited Eu++ electron is quickly transferred to a Sm+++ trap. The trap state is more than 1 eV below the conduction band and quite stable. Formally, the Eu++ becomes Eu+++ (Eu++ with a bound hole) and the Sm+++ becomes Sm++ via a charge-transfer reaction. In this state the phosphor is primed. Irradiating the phosphor with IR light of 980 nm, although 1.1 $\mu$m or so is best, kicks electrons out of the Sm traps and allows them to fall back into the Eu $5d$ excited state. The Eu $5d$ to $4f$ transition back to the ground state produces visible light emission peaking at about 640 nm; the difference between the wavelengths of the excitation and emission maxima is due to Stokes shift. The maximum amount of light which can be liberated during photostimulation is limited only by saturation of the Sm co-activator sites.

In double illumination phosphors, the process of excitation proceeds by a two-step mechanism: incident light of one wavelength, typically blue or UV, excites electrons directly to the conduction band and these electrons quickly migrate to acceptor states or 'traps' with energy somewhat below the conduction band. These states have a relatively long lifetime. The phosphor is said to be 'sensitized' when a significant fraction of these acceptor states are occupied. Subsequent irradiation of such a sensitized phosphor with light of a second wavelength, often red or IR wavelength, can induce transitions from the acceptor states to higher-energy states which decay by normal phosphorescence.

At present, the two most common storage phosphors have broad band emission at 520 nm and 650 nm and are intended for monochromatic application.

Figure 2:
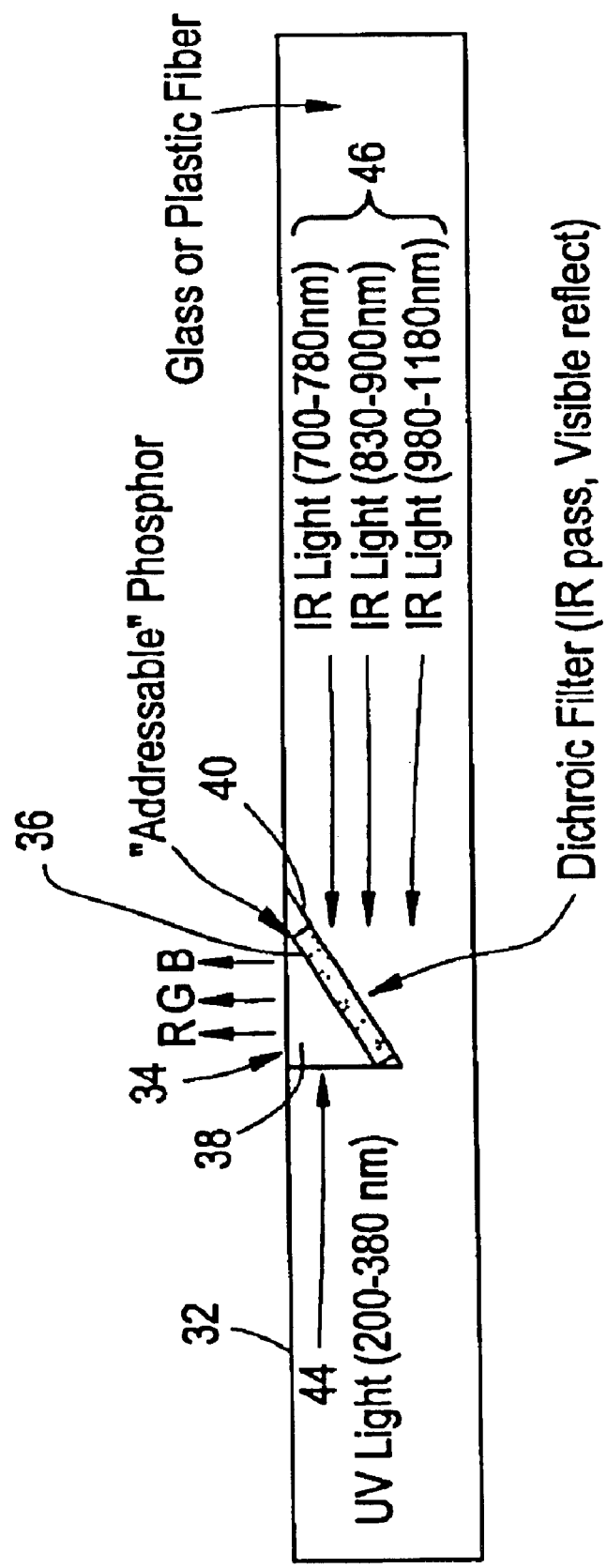
FIG. 2 shows the same optical luminescent display device of FIG. 1, but using multiple IR wavelengths to stimulate visible RGB lights.
Figure 3:
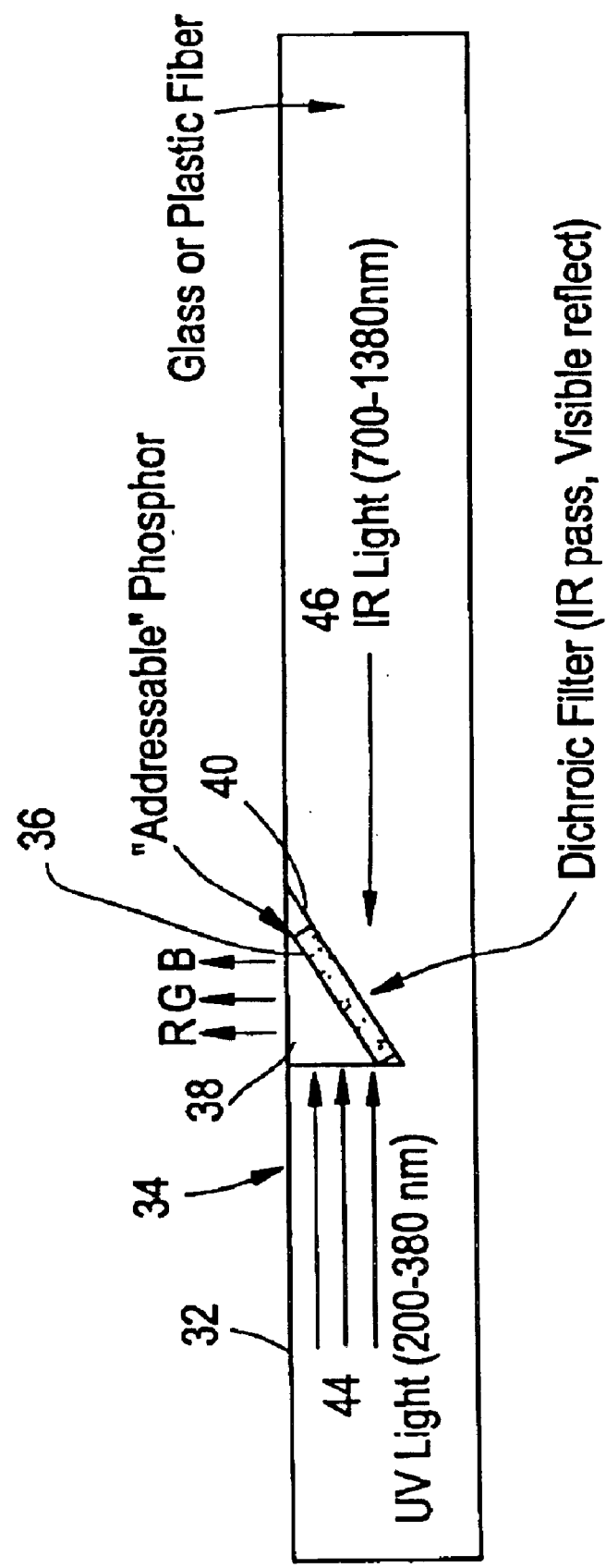
FIG. 3 shows the same optical luminescent display device of FIG. 1, but using multiple UV wavelengths to stimulate visible RGB lights.
Figure 4:
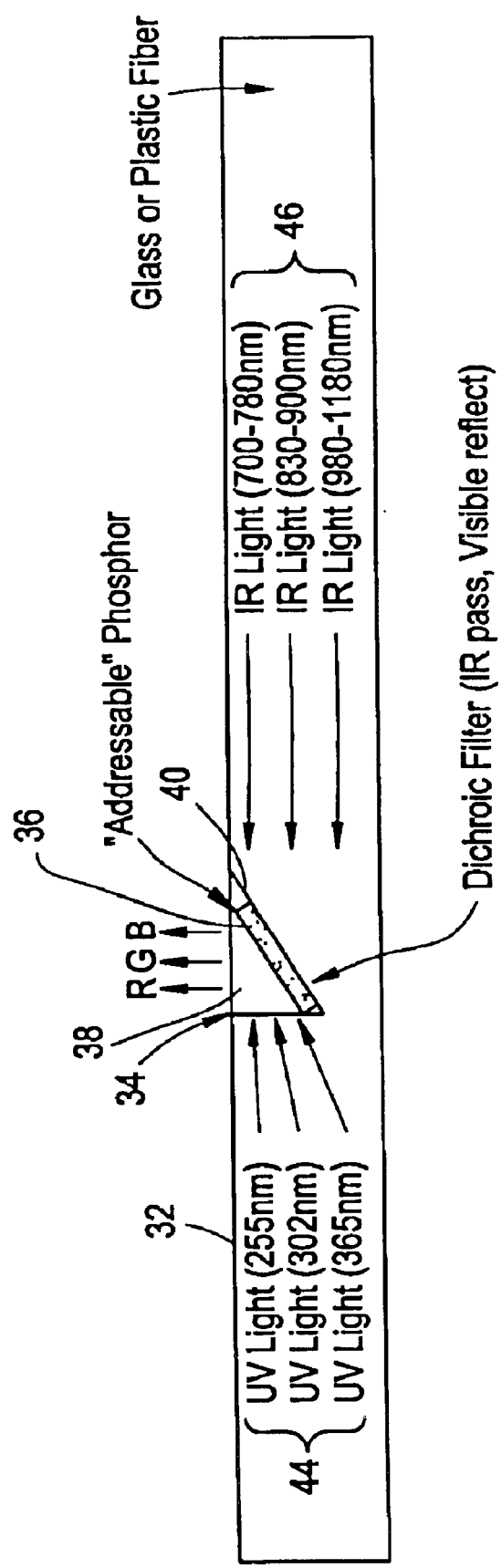
FIG. 4 is a scheme for multiple UV sources and multiple IR sources to address individual visible RGB light coincidentally (simultaneously).

The spectrum of the visible light emitted by individual phosphor elements can be tailored chemically, or by the use of superposed optical filters, permitting a full-color display to be realized. FIGS. 2–4 illustrate the ability to change the color of the visible light emitted by a double illumination phosphor by adjusting the amount of radiation of IR light or UV light within various frequency bands. For example, as shown in FIG. 2, with sensitizing UV radiation between 200 and 380 nm and using a EuSm phosphor, blue light is emitted if IR light of approximately between 700 and 780 nm is supplied. Green light is emitted if IR light of approximately between 830 and 900 nm is supplied. Red light is emitted if IR light of approximately between 980 and 1180 nm is supplied.

FIG. 4 illustrates that with sensitizing IR radiation between 700 and 1380 nm, using a EuSm phosphor, blue light is emitted if UV light of approximately 255 nm is supplied. Green light is emitted if UV light of approximately 302 nm is supplied. Red light is emitted if UV light of approximately 365 nm is supplied.

Conventional rare earth dopants such as thulium, cerium, europium and samarium can be utilized to adjust the color emitted by a phosphor. In general, these phosphors possess a nanosecond rise time, and decay times that vary from nanoseconds to milliseconds. Thus, there is sufficient control over phosphorescence for optimization of display times and rapid readout technologies. Therefore, the alkaline earth materials are suitable for application to optical switching technologies and the next generation of flat panel display materials.

Figure 5:
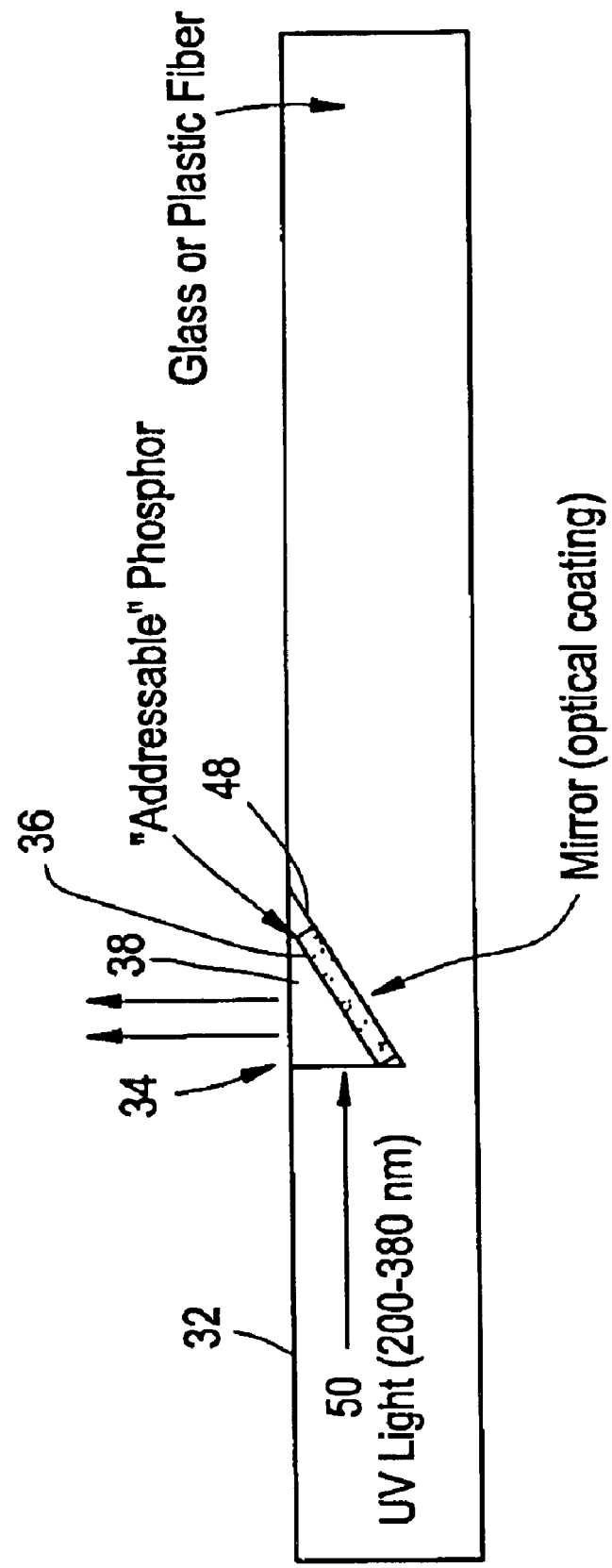
FIG. 5 shows a luminescent material embedded in a notch in the path of radiation within the optical fiber, thereby causing the luminescent material to emit visible light.

FIG. 5 illustrates another variation of the optical luminescent display device 30. This variation is intended to provide radiation 50 in the optical fiber 32 from one direction. The radiation 50 can be any type of radiation that will cause the single-illumination luminescent material 36 to emit the desired radiation wavelength. If the luminescent material 36 is a phosphor, UV light of 200–380 nm or IR light of 700–1380 nm can be used to cause the luminescent material 36 to emit visible light. For example, to produce red, $YVO_4$:Eu or $3.5MgO.0.5MgF_2.GeO_2$:Mn phosphors can be used. To produce green, Zh.Ge.O.Mn phosphor can be used. To produce blue, $(SrCaBa)_5(PO_4)_3Cl$:Eu phosphor can be used. The above listed phosphors are activated by UV light between 200–380 nm, ideally 365 nm., and are commercially available from Nichia Chemical Industries, Ltd., part numbers NP-312, NP-320, NP-202, NP-105, respectively. The notch 34 is provided with a mirror coating 48 to enhance the amount of radiation provided to the luminescent material 36 and reduce the amount of visible light emitted by the luminescent material 36 entering the optical fiber 32.

Optical Switch

Figure 6:
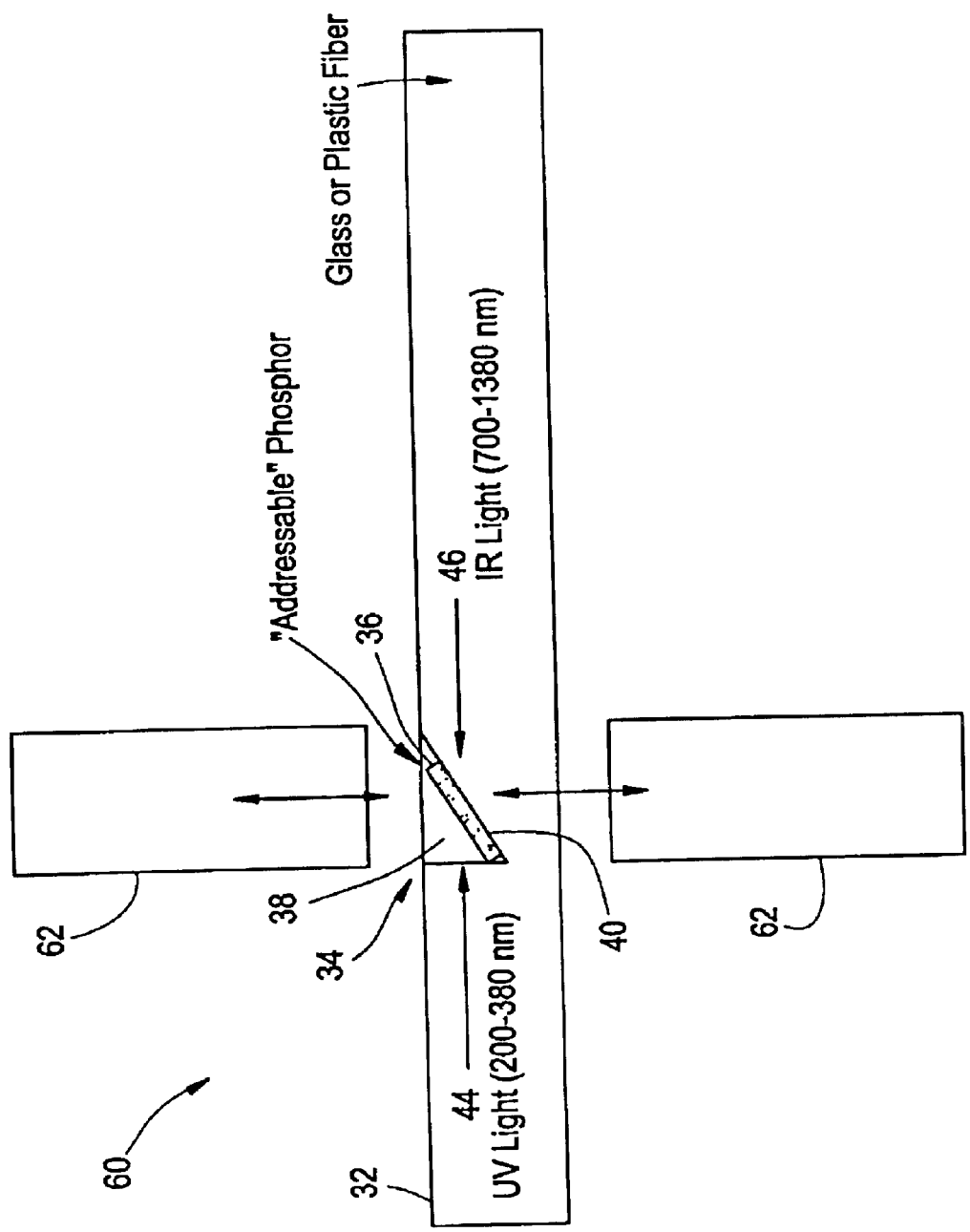
FIG. 6 shows an optical switch using luminescent material.

Another embodiment of the invention involves an optical switch. An optical switch device 60 is shown in FIG. 6. An optical luminescent display device 30 is provided with a luminescent material 36 and one or more optical pickups 62. A dichroic filter 40 is optional. The luminescent material 36 is a double illumination luminescent material, requiring two types of radiation to emit visible light. The optical switch device 60 is activated when both types of radiation are provided within the optical fiber 32 to cause the luminescent material 36 to emit visible light. For example, when both UV light 44 and IR light 46 are provided, a luminescent material 36, such as a phosphor, will emit visible light. The optical pick up 62, which may be accompanied by another optical pick up 62, pick up the visible light to provide the switch output to the desired location.

Figure 7:
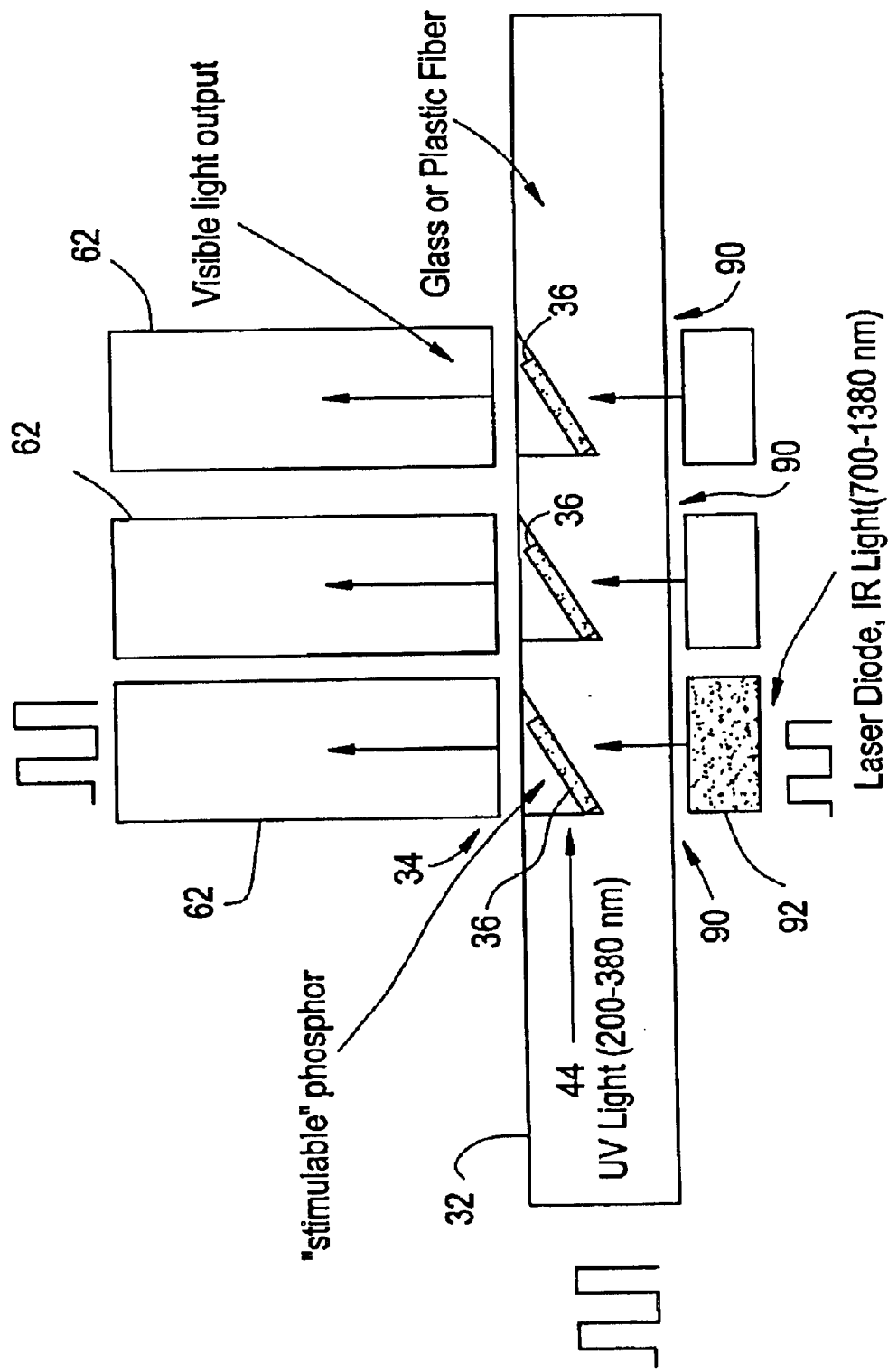
FIG. 7 shows an optical switch modulated by an IR laser diode or IR LED.

Another variation of an optical switch is shown in FIG. 7. UV light 44 is radiated within the optical fiber 32 from either direction. An optical switch 90 is formed from a laser diode 92 arranged to provide IR light to a luminescent material 36 located in or near notch 34 of optical fiber 32. UV light 44 is provided within the optical fiber 32. To activate the optical switch 90, the laser diode 92 is activated, thereby providing IR light to the luminescent material 36. The luminescent material 36 is a double illumination luminescent material, requiring two types of radiation to emit visible light. UV light 44 is already provided in the optical fiber 32. Therefore, when the laser diode 92 provides IR light, the luminescent material 36 emits visible light. This visible light communicates with the optical pickup 62, providing a modulated visible light output. To avoid multiple luminescent materials 36 emitting visible light when only one laser diode 92 is activated, the optical switches 90 can be spaced far apart. Ideally, each optical switch 90 is formed from a luminescent material 36 activated by a different frequency of IR light than that of nearby optical switches 90. Therefore, a corresponding frequency laser diode 92 is used to activate the luminescent material 36 in each optical switch 90, allowing closer spacing of the optical switches 90. Optionally, an IR LED can be used in place of the laser diode 92.

It is understood that both embodiments of the optical switch can be operated using radiation types other than discussed above, such as visible light or any energy capable of causing the luminescent material 36 to emit the desired radiation. A luminescent material 36 to provide a non-visible output, such as IR, for example, may also be used. Also, IR and UV radiation can be reversed in the descriptions above.

Optical Display Panel

Figure 23:
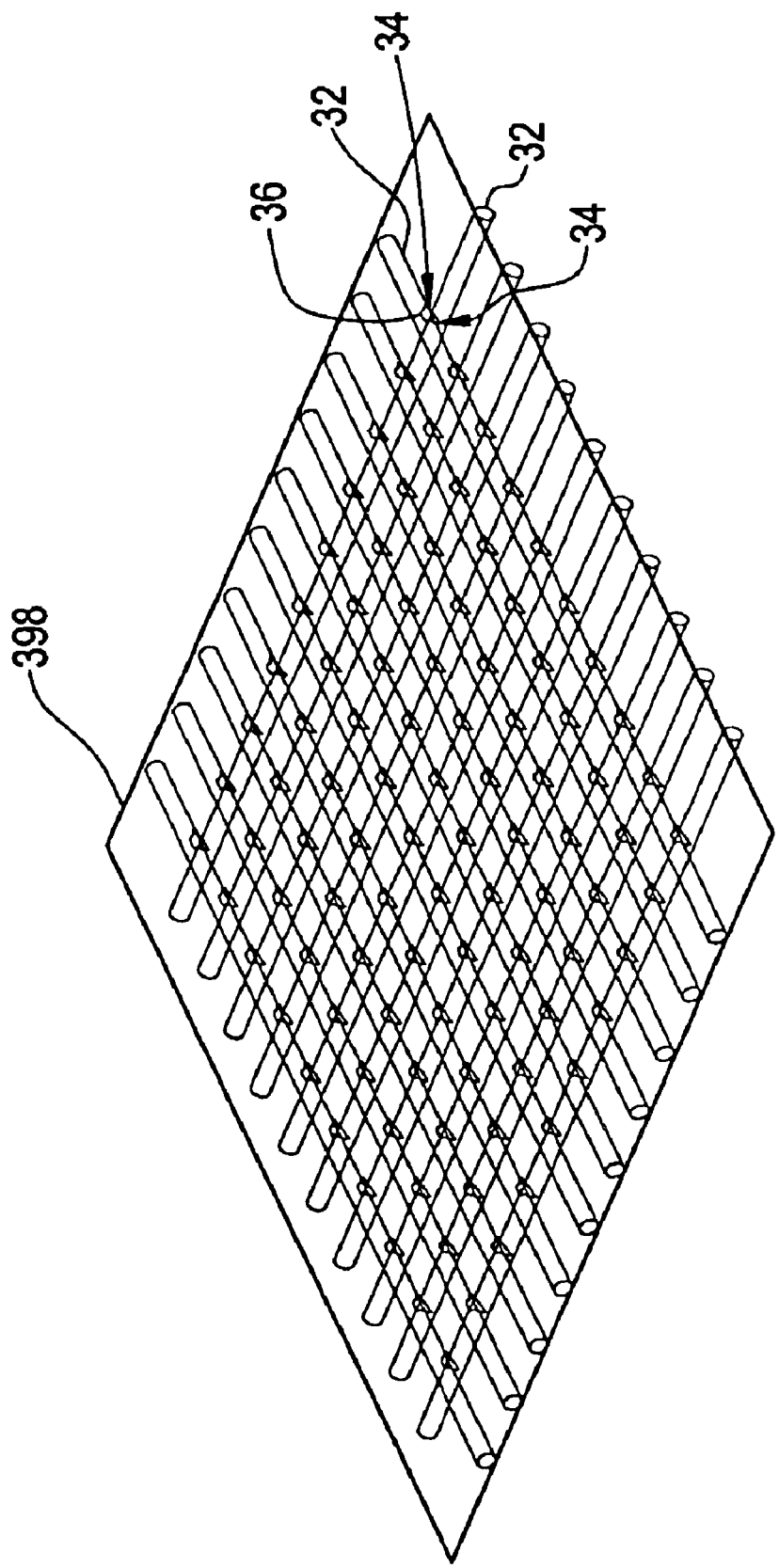
FIGS. 23–25 are progressively closer perspective views showing the intersection of optical fibers to form an optical display panel.
Figure 24:
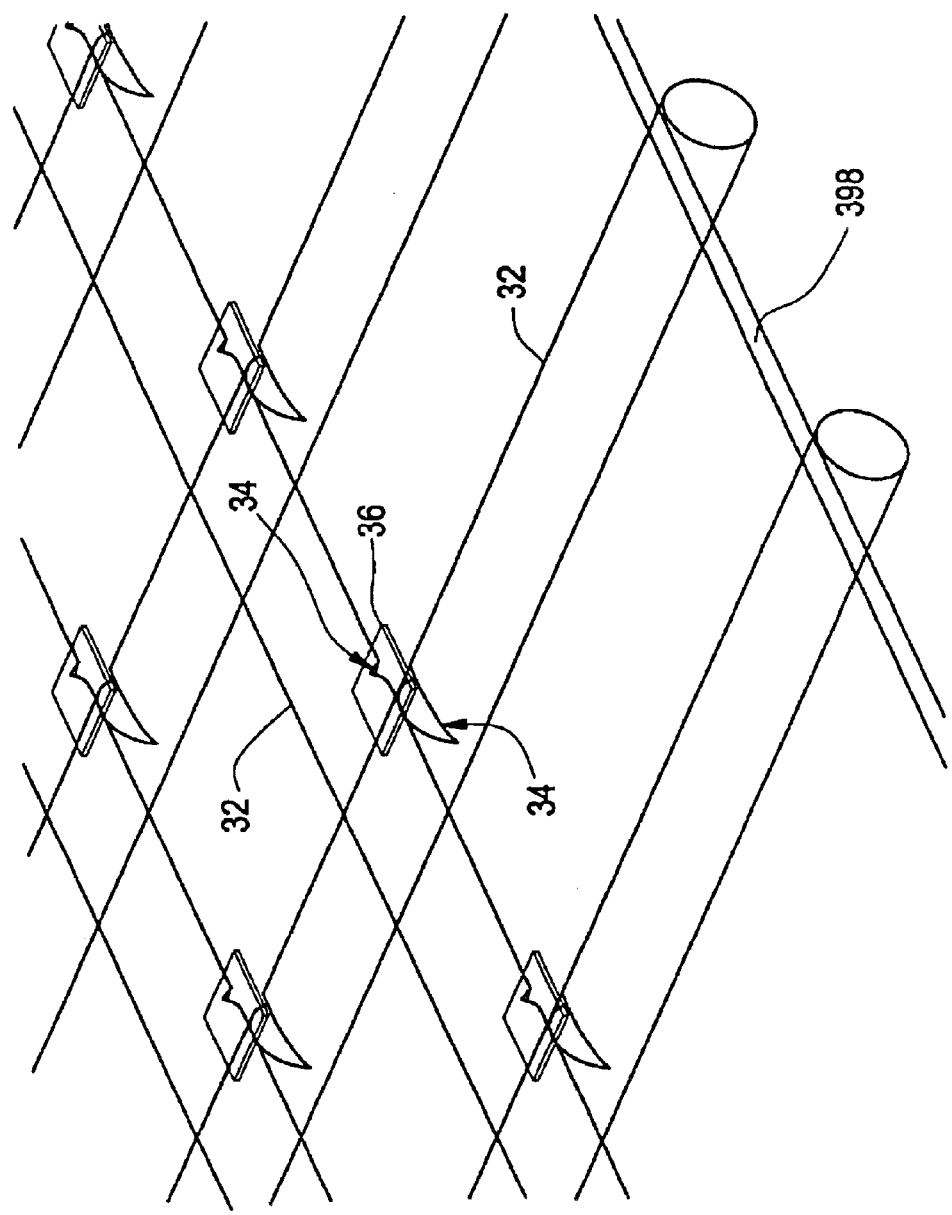
Figure 25:
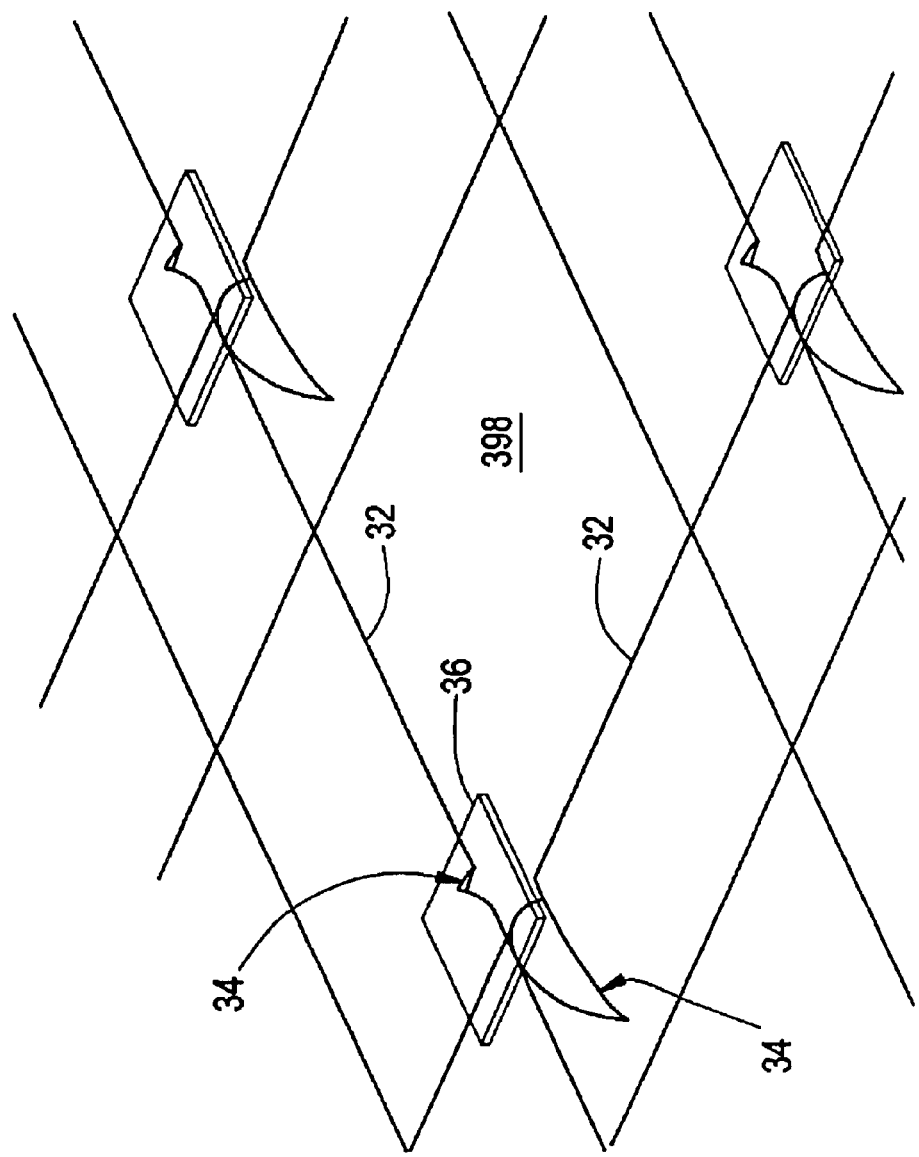
Figure 26:
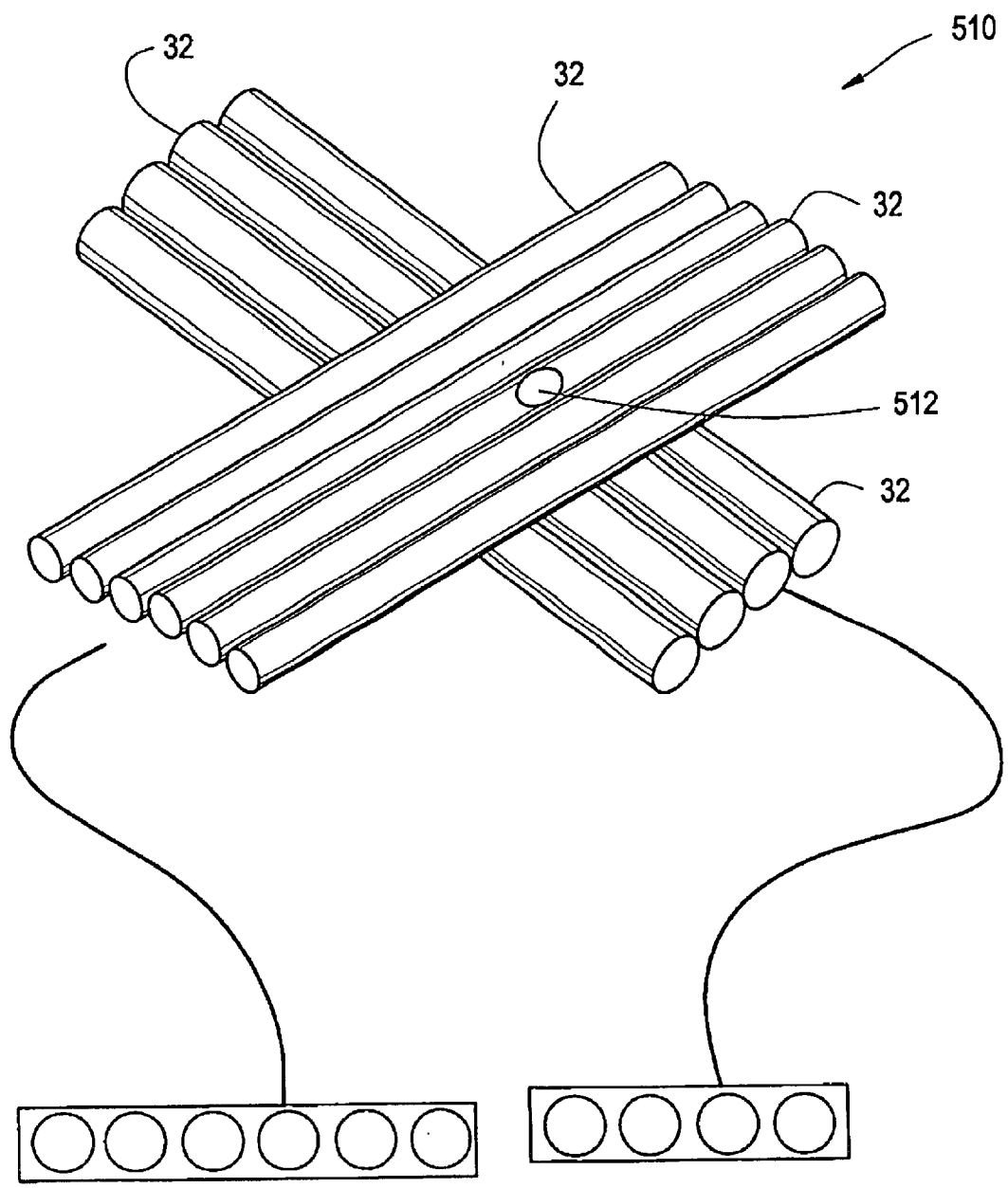
FIG. 26 is a perspective view of the structure of a scanning optical fiber matrix with detailed structural elements omitted for clarity.

Another embodiment of the invention involves a matrix of optical fibers to form an optical display panel. FIGS. 17 and 23–26 illustrate examples of such a matrix configuration. FIGS. 8–14 provide a variety of examples of the structure that can be used for each pixel of the optical display panel. FIGS. 23–25 are perspective views of examples of the structure of an optical display panel. FIG. 26 illustrates an optical display panel with detailed structural elements omitted for clarity.

A double illumination luminescent material can be used as the basis for a coincidentally-addressed optical display panel. Side-emitting optical fibers (T. Wang et al., U.S. Pat. No. 5,673,344) are ideally-suited to provide coincident illumination of the luminescent pixel elements in a display of this type, as seen in FIGS. 8–14 and 24.

U.S. Pat. No. 190 5,673,344 is incorporated herein by reference in its entirety. One optical fiber in these figures delivers 'sensitizing' (typically blue or UV wavelength) radiation to one row of phosphor pixels at a time, while another fiber delivers secondary exciting radiation (typically red or IR) to each column of phosphor pixels.

Pixel elements which receive either (i) 'sensitizing' radiation only or (ii) 'secondary' radiation only do not emit light. With only a single horizontal fiber and a single vertical fiber active, only the pixel at the intersection of these fibers will radiate light. By the well-known method of sequential activation or time-multiplexing of the horizontal and vertical fibers, an image may be displayed.

Figure 8:
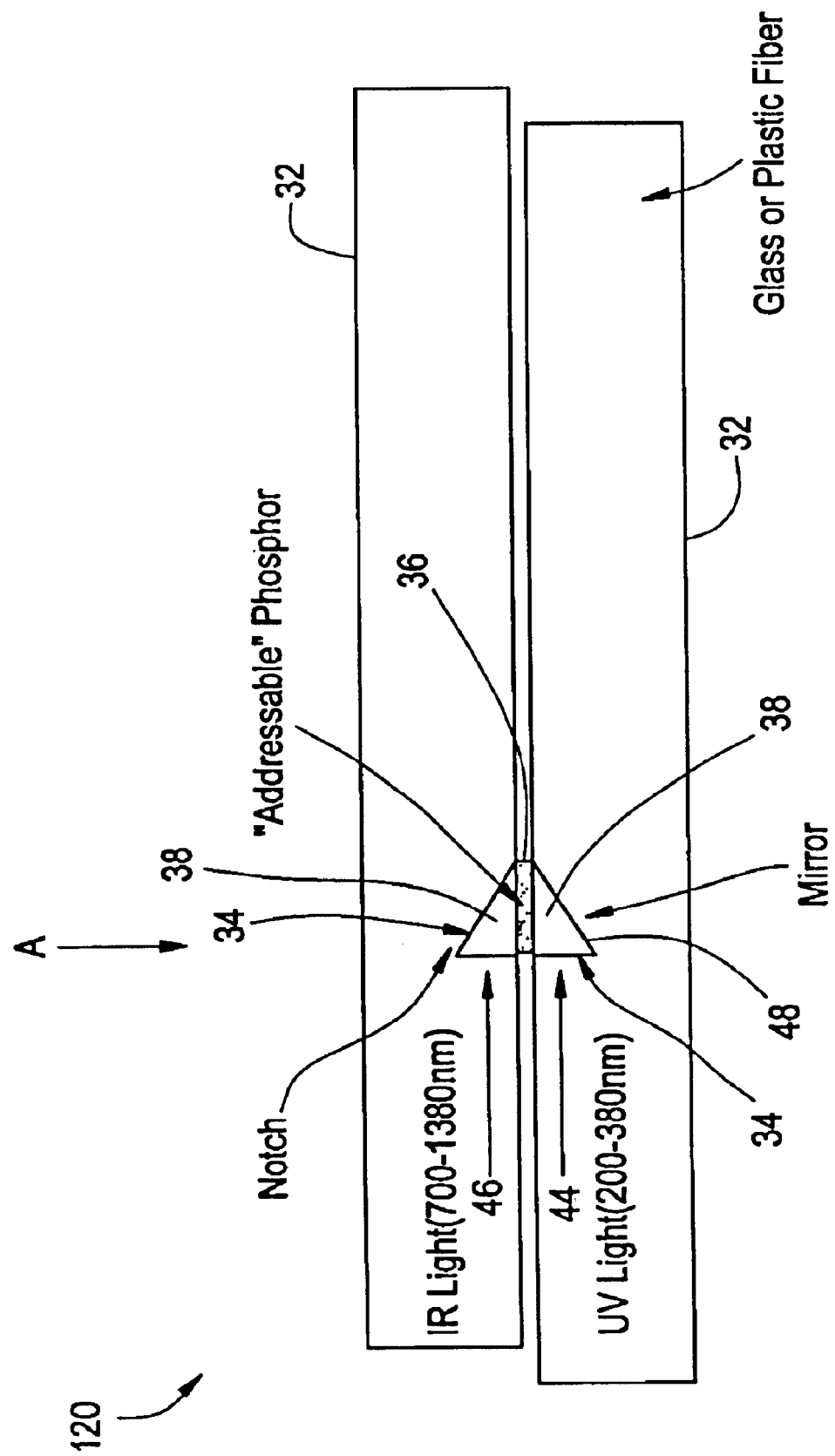
FIG. 8 is a perspective view of the cross section of two side-emitting optical fibers with a luminescent material between the notches.

As shown in FIG. 8, in an optical luminescent display device 120, two optical fibers 32 are used to provide radiation to a luminescent material 36. For a double illumination luminescent material, UV light 44 is provided by one optical fiber 32 to sensitize the luminescent material 36, located between the optical fibers 32. To cause the luminescent material 36, to emit visible light, IR light is provided by the other optical fiber 32. Ideally, a mirror 48 may be used to increase the amount of UV light 44 that reaches the luminescent material 36 reduce the amount of visible light emitted by the luminescent material entering the optical fiber 32 having the mirror 48. A mirror 48 is not used on the other optical fiber 32 because the visible light shines through this optical fiber 32 for viewing. The direction of viewing of the device in FIG. 8 is shown by arrow A.

Although UV light 46 and IR light 44 are described above, any radiation can be used that will cause the luminescent material 36 to emit the desired wavelength of radiation, such as visible light.

Figure 9:
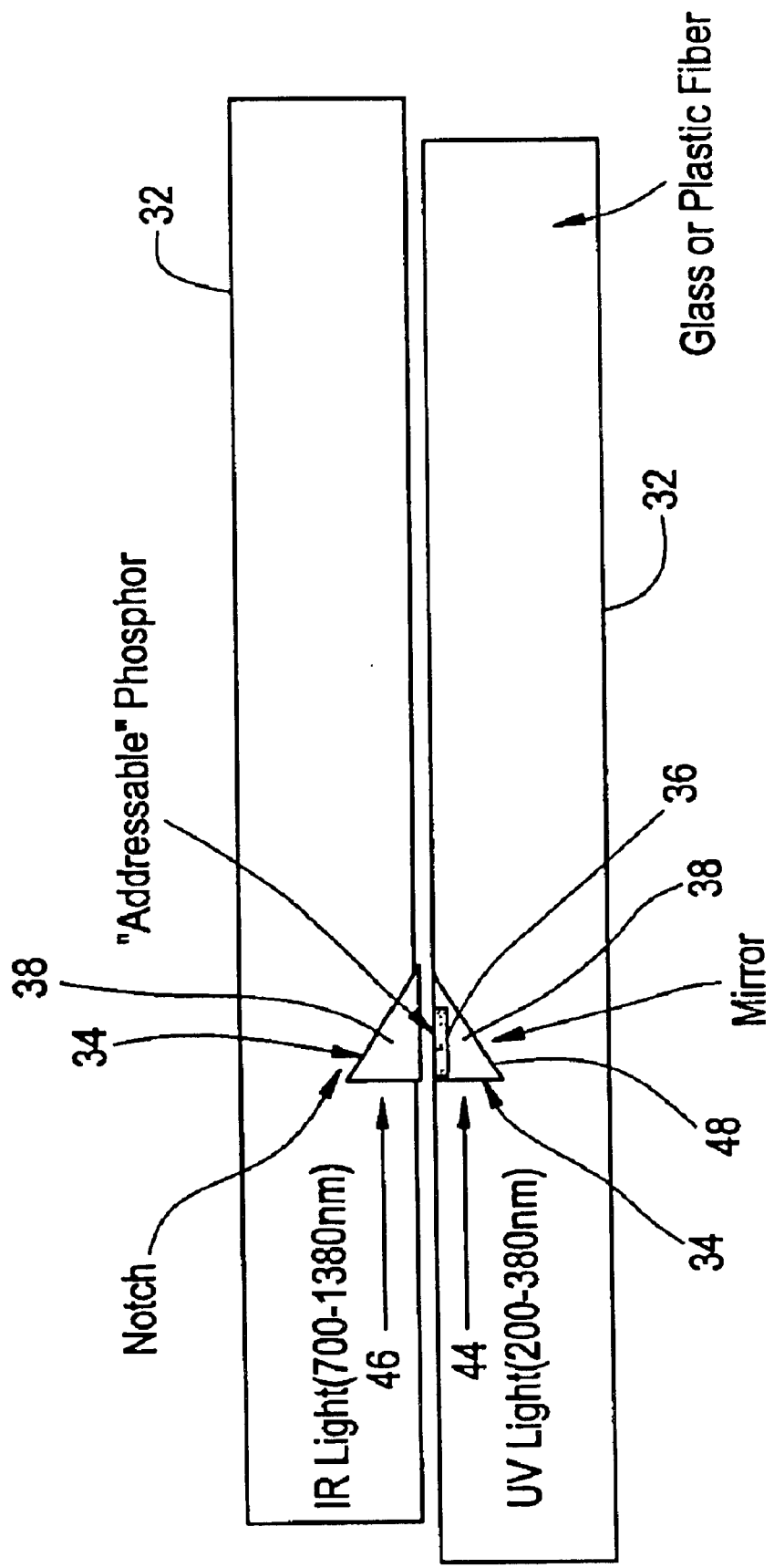
FIG. 9 is a perspective view of the cross section of two side-emitting optical fibers with a luminescent material coated in one notch.

FIG. 9 shows a structure similar to that shown in FIG. 8, except that, by way of example, a different position of the luminescent material 36 is shown. The notch 34 containing luminescent material 36 contains a filling material 38 so as to hold the luminescent material 36 in place. Other possibilities are available for the location of luminescent material 36. For example, luminescent material 36 may be located in one of the notches 34 at an angle or parallel to the axis of the optical fibers 32.

Figure 10:
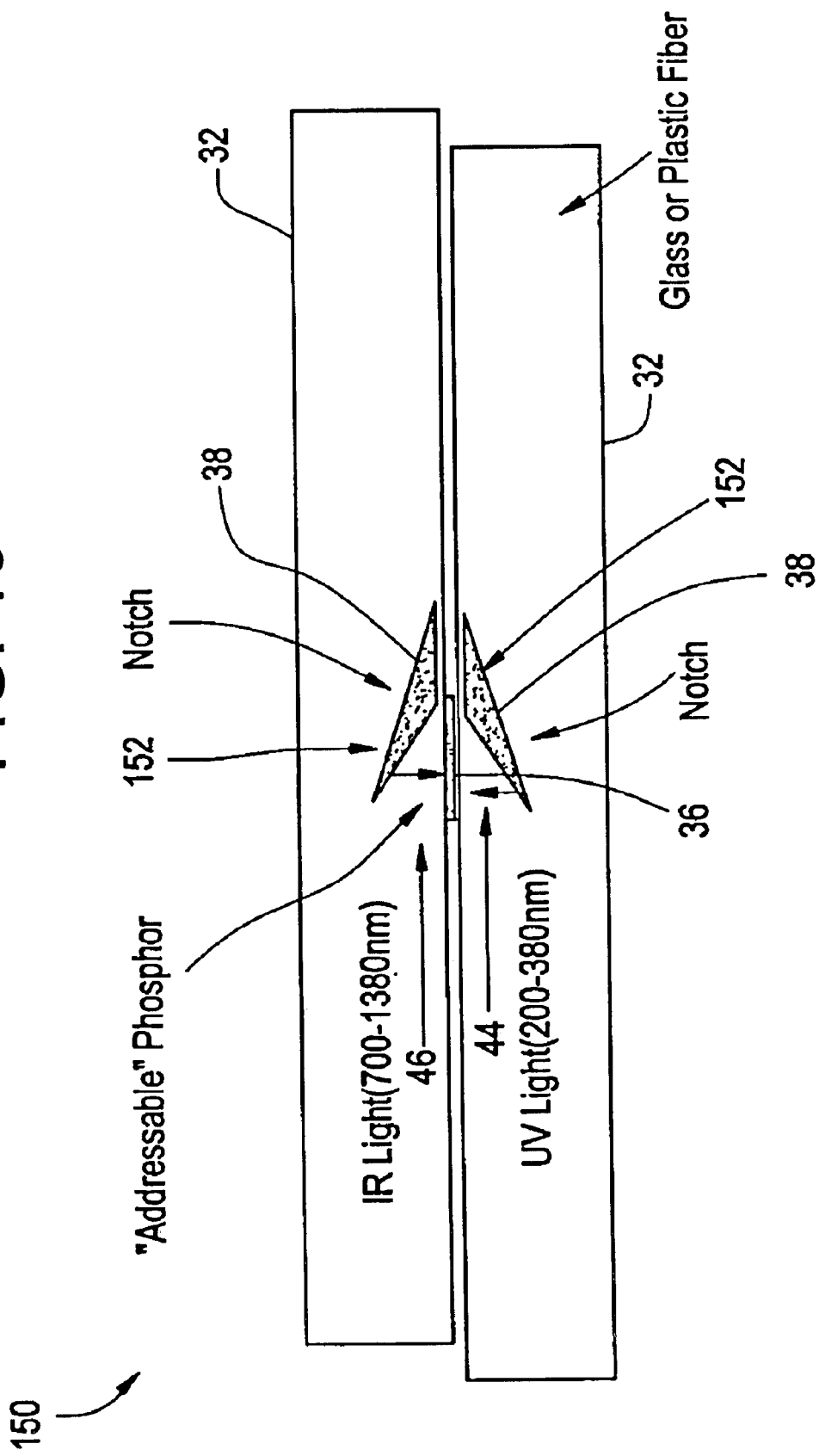
FIG. 10 shows a structure of triangular shaped notches for side-emitting radiation to a luminescent material.
Figure 11:
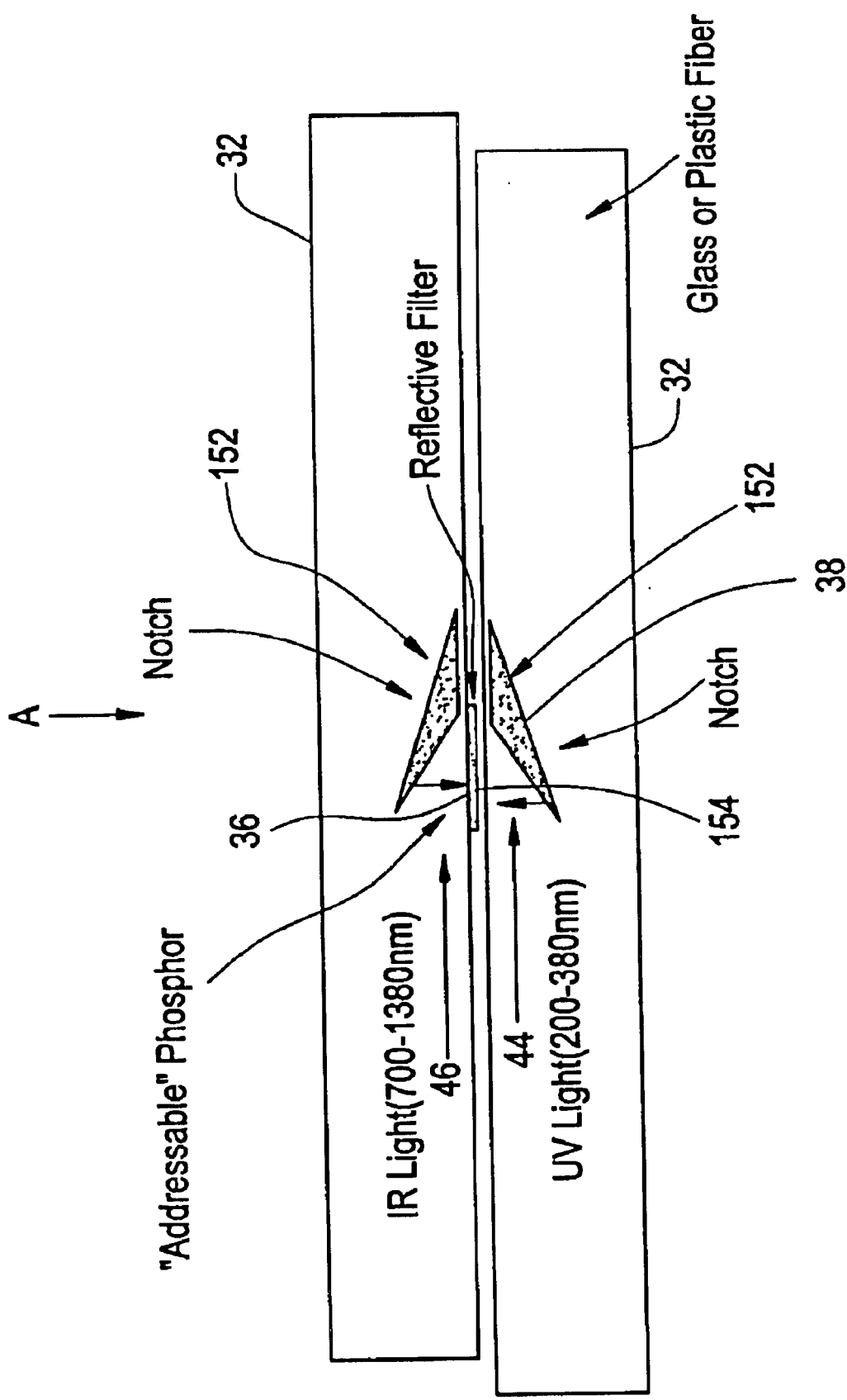
FIG. 11 shows a structure, including a filter, of triangular shaped notches for side-emitting radiation to a luminescent material.

FIG. 10 shows an optical luminescent display device 150 which has a structure similar to that shown in FIG. 8, accept that, by way of example, a different notch 152 configuration is shown. A variety of combinations of notch shape and location are possible FIG. 11 adds reflective filter 154. The reflective filter 154 can be configured to allow UV light 44 to pass, but reflect visible light. This would enhance the visible light emitted from the luminescent material 36 in the direction of the viewer. The direction of viewing is shown by arrow A. Notch 152 may be open or filled with filling material 38.

Figure 12:
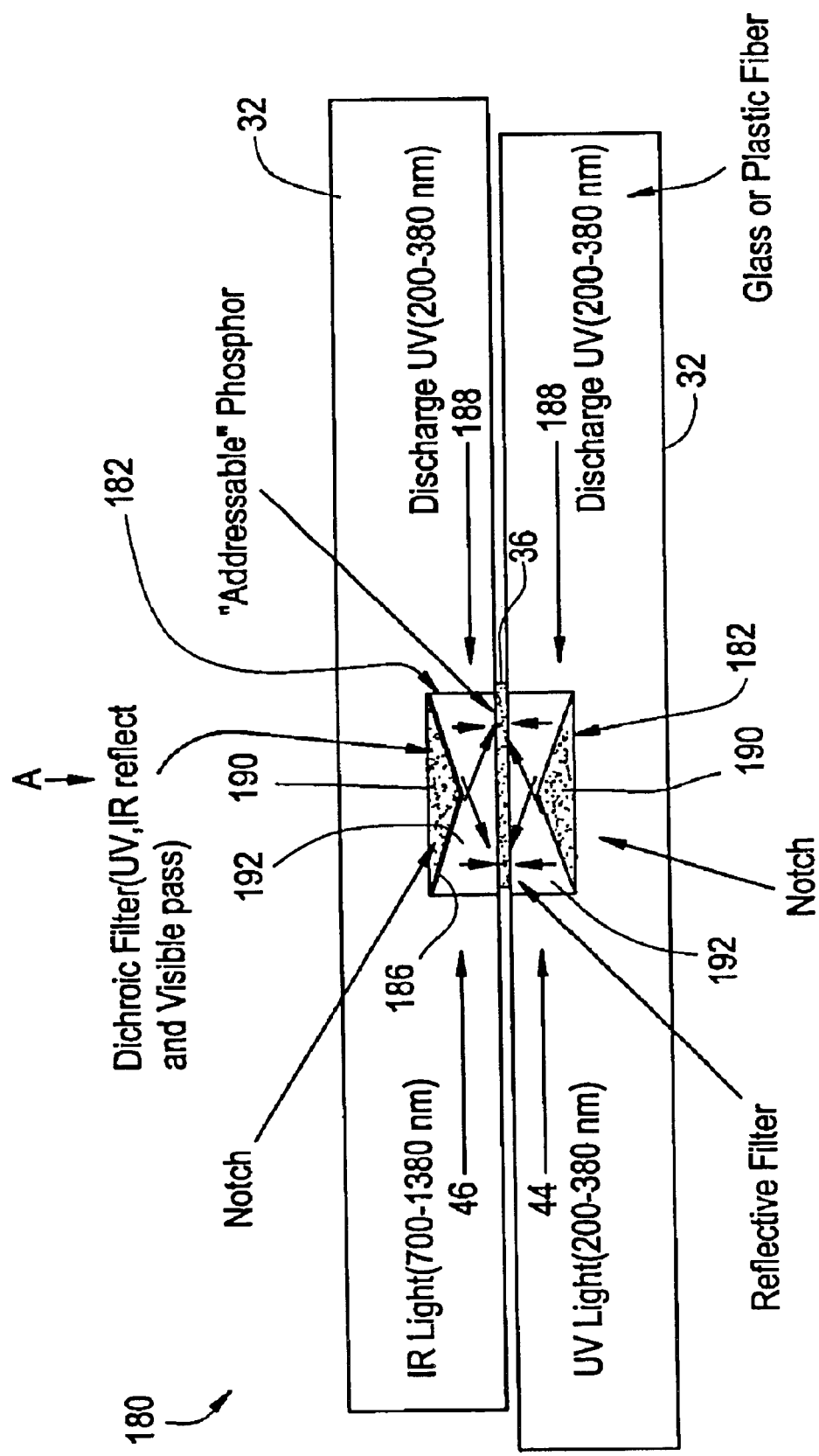
FIG. 12 shows a structure of inner side notches for charging and discharging the phosphors.
Figure 21:
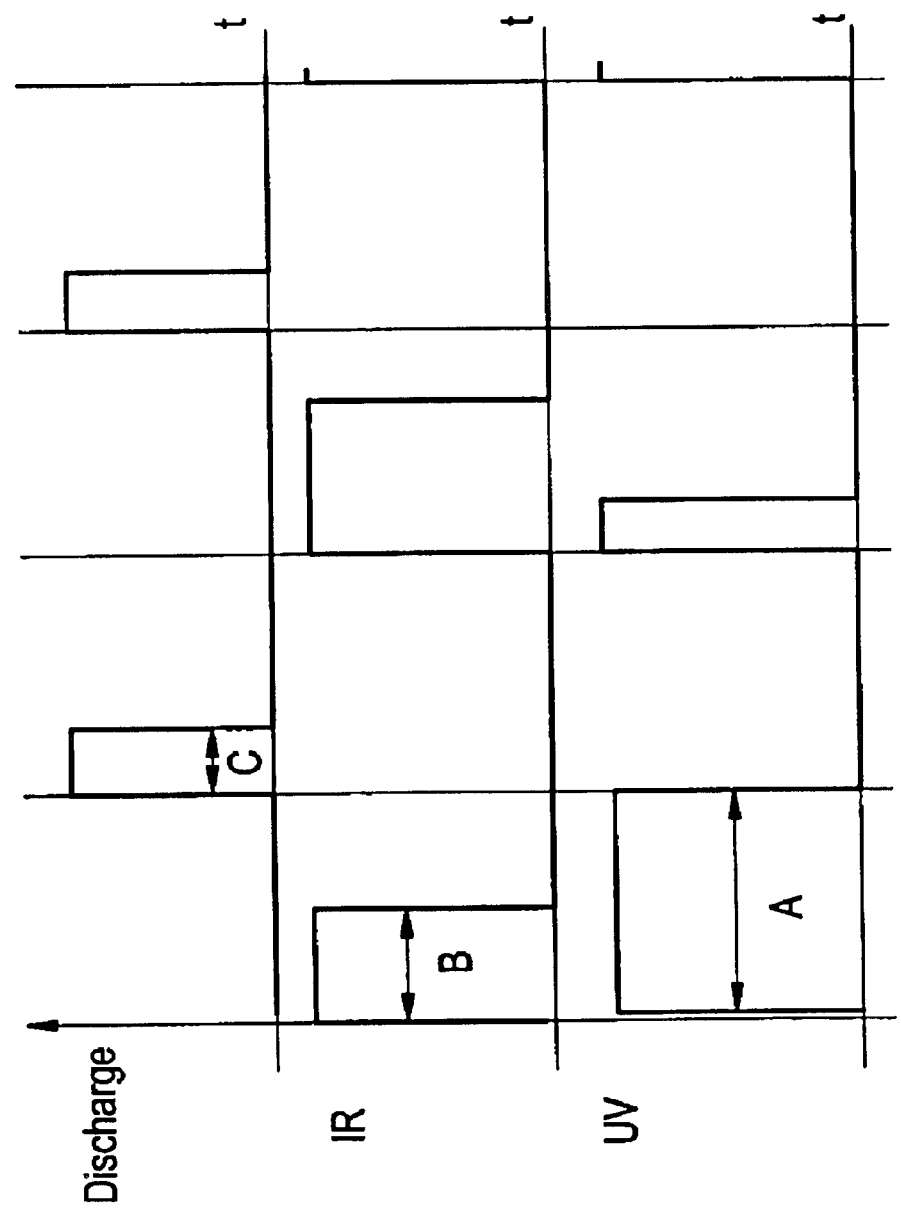
FIGS. 21 and 22 are examples of time charts for a matrix scanning system.
Figure 22:
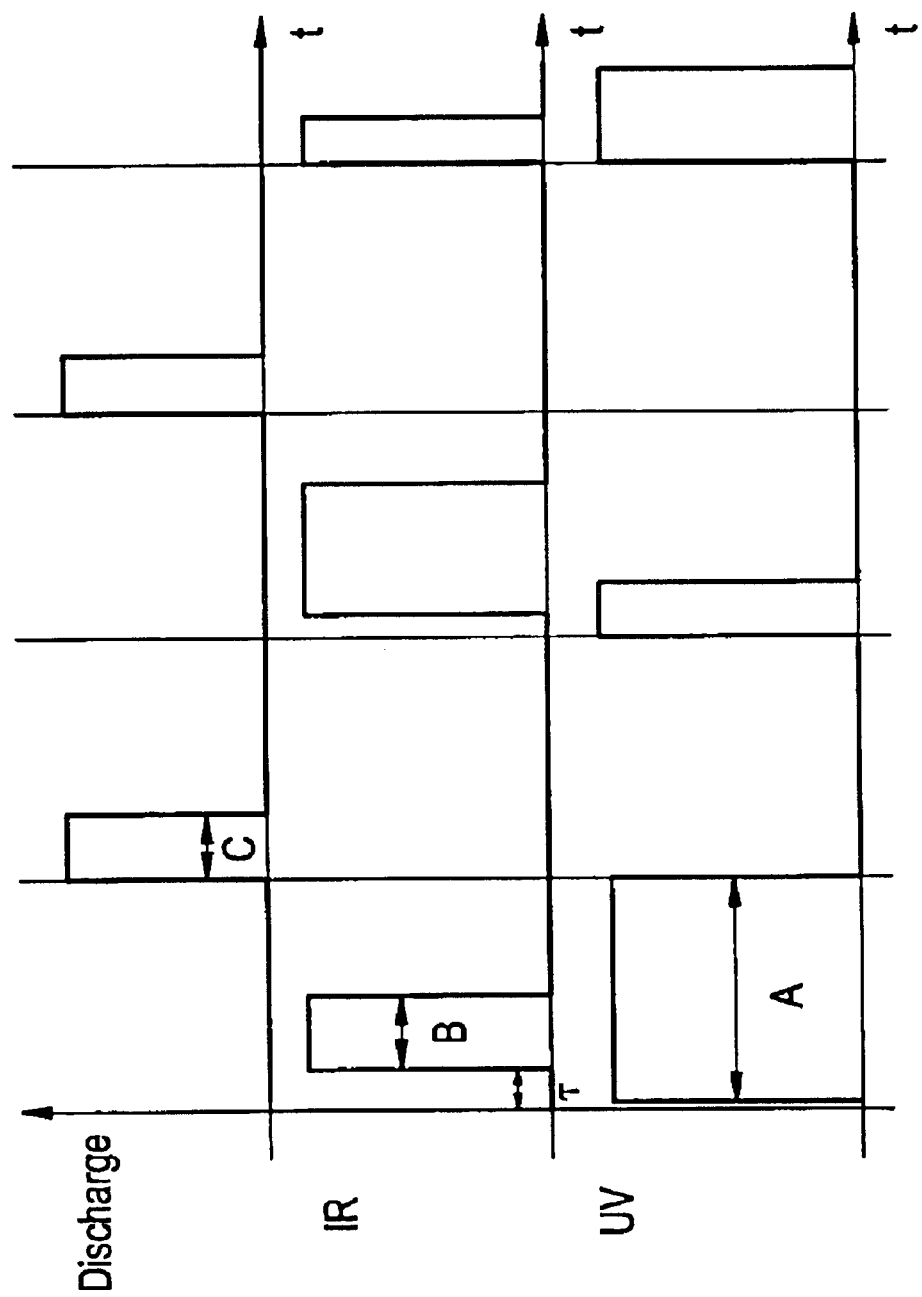

FIG. 12 shows an optical luminescent display device 180 which has a notch 182 containing a reflection pyramid 190. The reflection pyramid 190 is ideally formed with its peak set in form the edge of the optical fiber 32, to distribute radiation to the luminescent material 36, as shown by the exemplary small arrows, regardless of the direction from which the radiation is provided. The reflection pyramid 190 can be inserted into the notch 182, or the notch 182 can be formed with an inner edge forming a reflection pyramid 190. The area 192 within the notch 182 may be left open or, preferably, filled with a filling material. The optional dichroic filter 186 increases the amount of IR light 46 and discharge UV light 188 directed toward the luminescent material 36. However, visible light is allowed to pass through to the viewer, which is viewing in the direction of the arrow A. Discharge UV light 188 is provided to adjust the charge within the luminescent material 36. The discharge UV light 188, at a wavelength of between 200 and 380 nm, increases the charge of the luminescent material 36 so as to prevent or discontinue the emission of visible light form the luminescent material 36. This, in essence, restarts the sensitizing/excitation process of the luminescent material 36. Another process of applying UV light 44 can be followed by IR light 46 to result in the emission of visible light by the luminescent material 36. See FIGS. 21 and 22 as examples of timing charts that could be used in the application of discharge UV light 188, IR light 46, and UV light 44. The timing of FIG. 22 is preferred over that of FIG. 21, because the UV light has time to sensitize the luminescent material prior to the application of the exciting IR light.

If the luminescent material 36 does not possess, or has very short, memory properties, a discharge UV light 188 may not be necessary. In such a case, the emission of visible light would cease upon either UV light 44 or IR light 46 not being provided.

Figure 13:
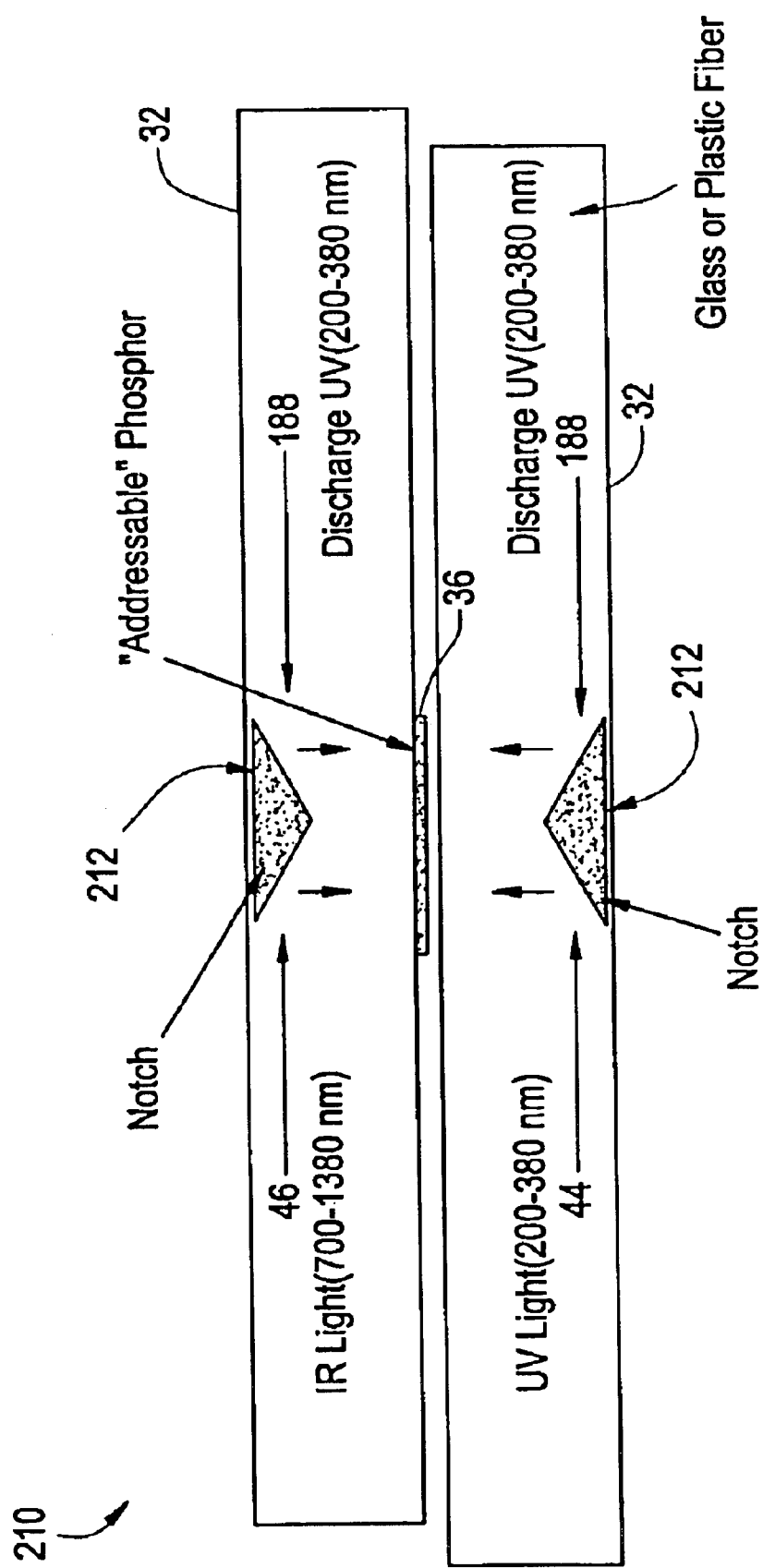
FIG. 13 shows the structure of two side-emitting fibers with V shape notches across from each other and sandwiching the phosphor between them for stimulating and addressing.
Figure 14:
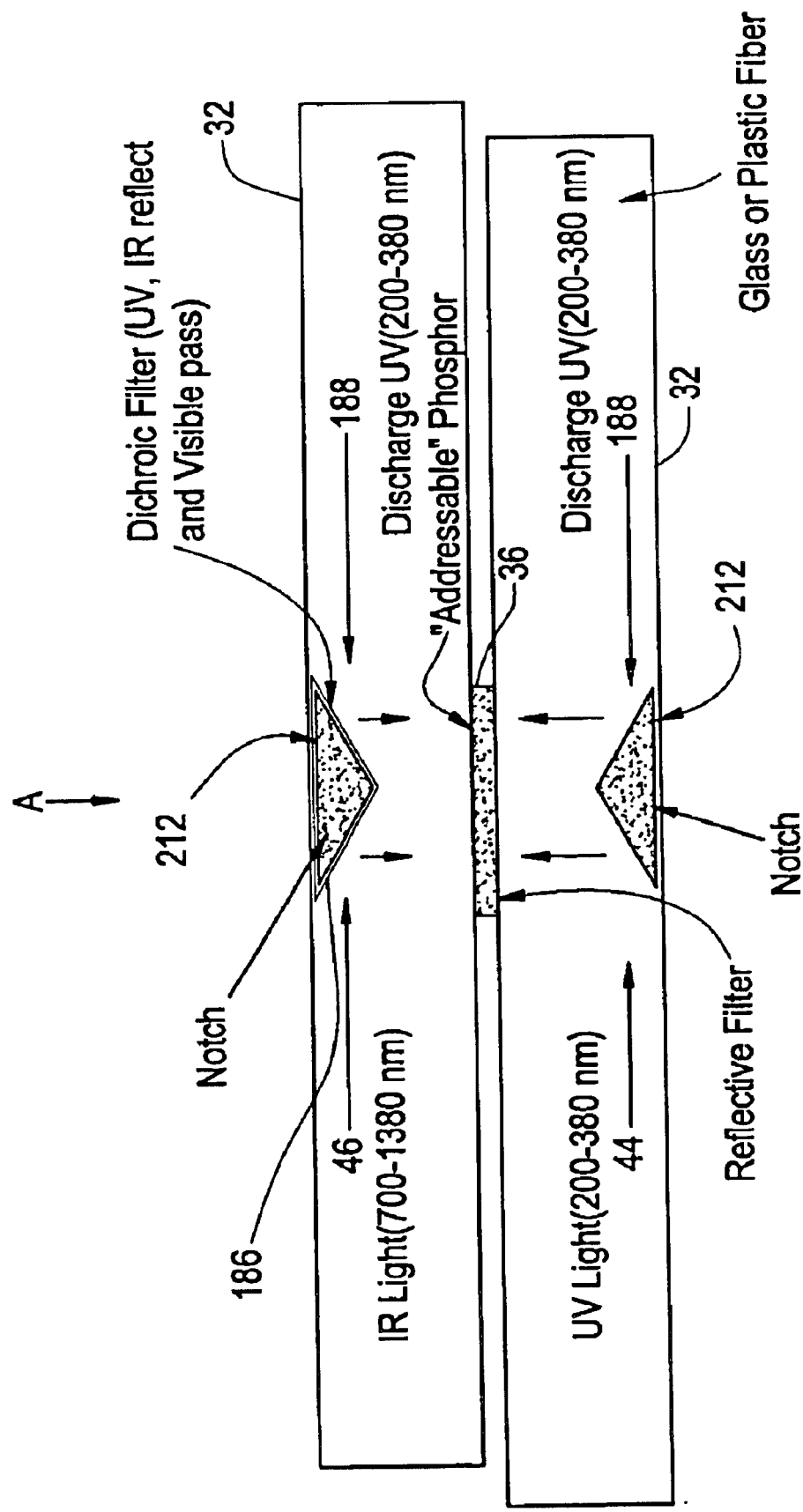
FIG. 14 shows the structure, including filters, of two side-emitting fibers with V shape notches across from each other and sandwiching the phosphor between them for stimulating and addressing.

FIG. 13 shows an optical luminescent display device 210 which has notches 212 formed on the outer sides of the optical fibers 32. FIG. 14 adds a dichroic filter 186. The dichroic filter 186 reflects UV light and IR light, but allows visible light to pass. The dichroic filter 186 increases the amount of IR light 46 and discharge UV light 188 directed toward the luminescent material 36. However, visible light is allowed to pass to the viewer, who is viewing in the direction of the arrow A. FIG. 14 shows the preferred location and orientation of the notches 212 with respect to the luminescent material 36 for the optical display panel of the invention.

Although FIGS. 8–14 show the fibers as parallel, the fibers can be perpendicular as shown in FIGS. 17, and 23–26, or at any angle. Parallel orientation is the least desirable orientation, as a row and column configuration can not be established with all the optical fibers oriented in the same direction, thereby frustrating individual pixel addressing.

Figure 15:
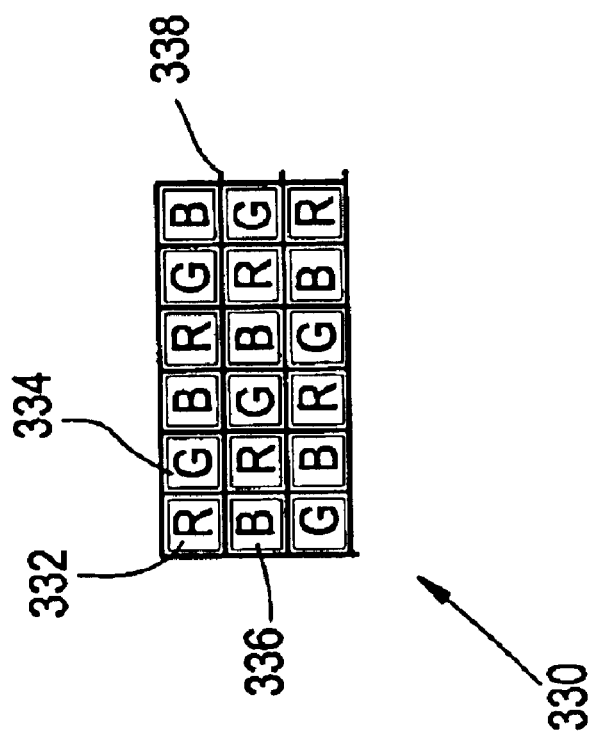
FIGS. 15 and 16 are exemplary patterns and pixel arrangements of the single-color addressable phosphors.
Figure 16:
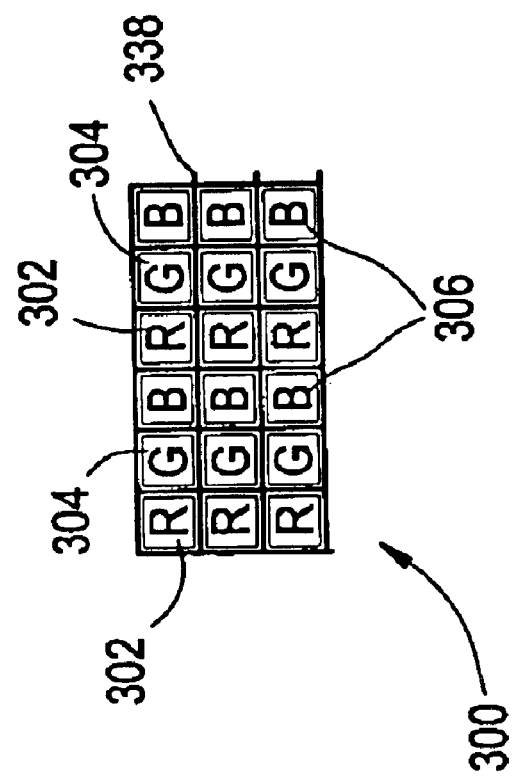

To form an optical display panel to display images in color, two types of luminescent materials can be used. Multi-color luminescent materials can be used such that the color of each pixel of luminescent material is adjusted by providing the proper wavelength of sensitizing and/or exciting radiation. Alternatively, single-color luminescent materials can be used. FIGS. 15 and 16 show examples of single-color pixel configurations.

FIG. 15 illustrates a standard pixel layout 300 with red pixels 302, green pixels 304 and blue pixels 306 arranged in row or column order. Ideally, the pitch will be 1.0 mm and the pixel width 0.95 mm, but these can be adjusted for various optical fiber diameters. To enhance the crispness of the image displayed by the screen, the pixel color groups should be arranged diagonally, as shown in FIG. 16. Red pixels 332, green pixels 334 and blue pixels 336 are shown in a preferred pixel layout 330. "R" "G" and "B" are shown in FIGS. 15 and 16 for illustrative purposes only. An optional black mask 338 is shown formed between each pixel. Use of the black mask 338 is preferable to enhance the clarity of the image displayed.

A phosphor, $BaFBr:Eu^{2+}$, can be used for a red pixel that will illuminate upon exposure to both UV and IR light. The phosphors SrS:Ce:Sm or SrS:Eu:Sm can be used for a green pixel that will illuminate upon exposure to both UV and IR light. A phosphor, $Ba_3(PO_4)_2:Eu^{2+},La^{3+}$, can be used for a blue pixel that will illuminate upon exposure to both UV and IR light.

Figure 17:
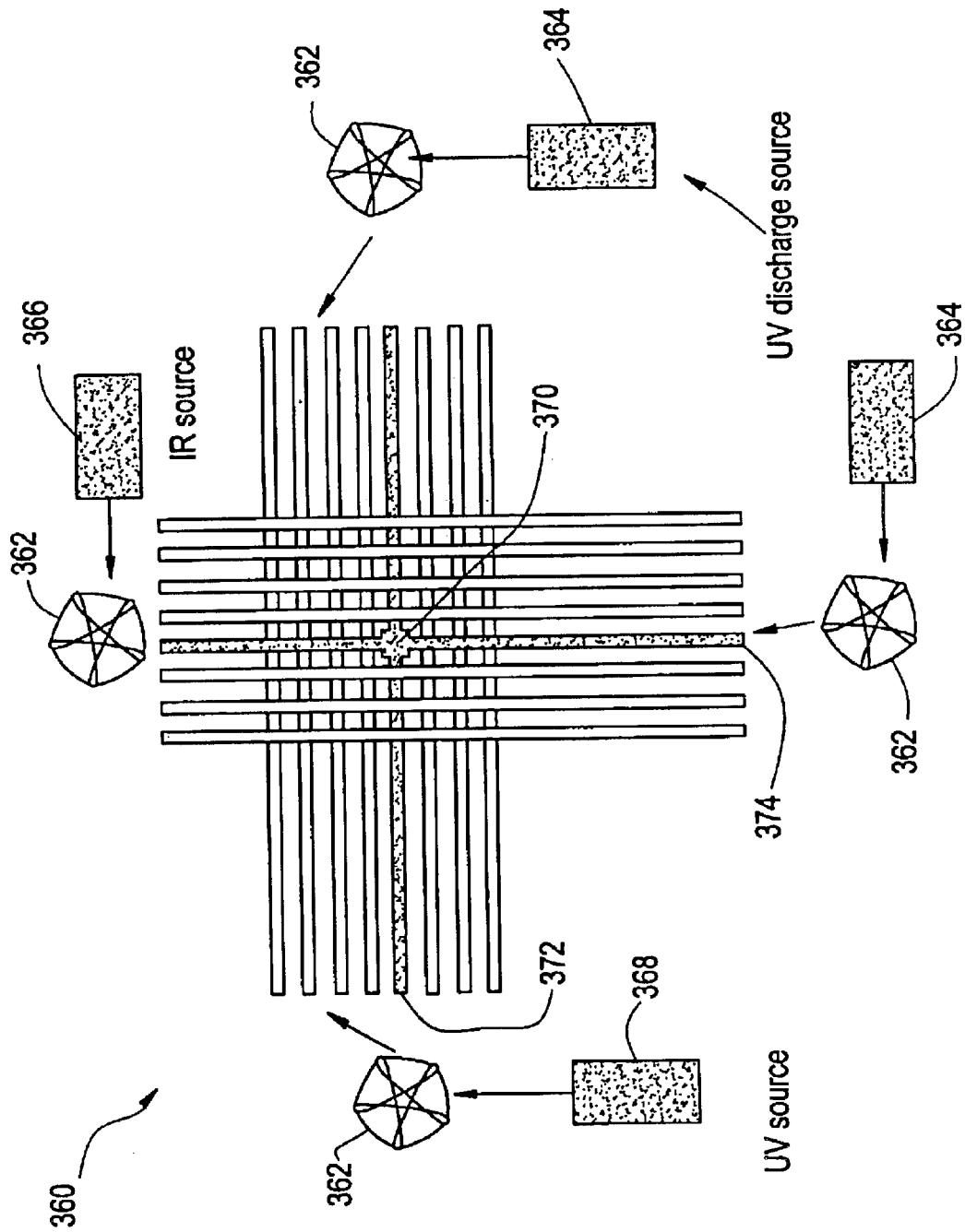
FIG. 17 illustrates a matrix addressing method for optical photo-stimulable phosphors with UV, IR or flash discharge sources and optical beam scanning systems.

A perpendicular matrix 360 is shown in FIG. 17. A pixel 370, a section or piece of luminescent material analogous to luminescent material 36, is addressed by radiation provided to the optical fibers 372 and 374. As described with relation to FIGS. 12–14, the pixel 370, analogous to luminescent material 36, is provided with UV light, from a UV source 368, IR light, from an IR light source 366, and UV discharge light, from a UV discharge source 364. Each of these light or discharge sources is directed via an addressing means 362 that selects one fiber per axis. For example, the proper optical fiber 372 is selected from among the rows or the proper optical fiber 374 from among the columns. The sources can be arranged to provide radiation from the same end of the fiber. For example, a UV discharge source 364 can be supplied from the same fiber end as the IR source 366. It is also possible to use one source per axis and adjust the wavelength of the output to the type of light required.

Figure 18:
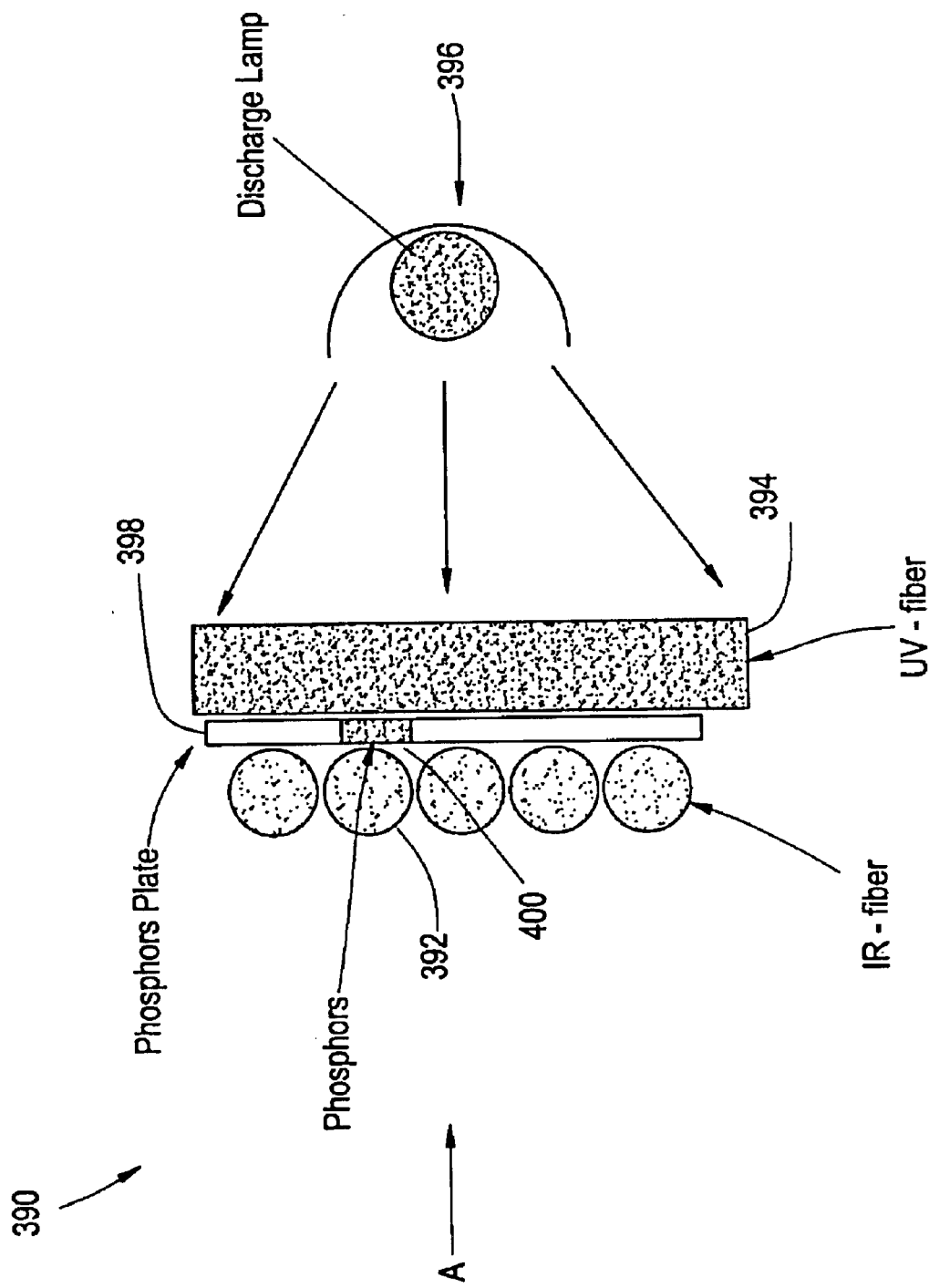
FIG. 18 shows a structure of matrix addressing with one back-side discharge lamp.

Although luminescent material, such as phosphor, can be deposited directly on the optical fibers by using processes such as printing, coating or sputtering, alternatively, a phosphor plate 398, shown in FIG. 18, can be used. The phosphor plate 398 can be formed using a substrate, typically glass, although plastic is also suitable. Powdered phosphor is deposited upon the substrate. The powder can be deposited using processes such as printing, coating or sputtering. The substrate can be opaque, requiring radiation to be provided to the phosphor from the same side of the substrate as the phosphor. Alternatively, a transparent or translucent substrate may be used to allow radiation to be provided from both sides of the substrate. The preferred substrate for the optical display panel, shown in FIG. 18, is transparent. A second type of phosphor plate 398 involves a phosphor film, available commercially, wherein the phosphor is mounted to a film.

FIG. 18 illustrates another embodiment of the optical display panel 390 from a side view. The optical display panel 390 is viewed in the direction of arrow A. In this embodiment the optical fiber 392 provides IR light and the optical fiber 394 provides UV light to a section of a phosphor plate 398 disposed between the optical fibers 392 and 394. This section of the phosphor plate 398 functions as a pixel 400 of the optical display panel. A discharge lamp 396 is provided at the rear of the display to provide discharge radiation from outside the optical fibers. In this embodiment, the optical fiber 392 providing IR light and the optical fiber 394 providing UV light do not need to also provide discharge radiation, as it is provided by discharge lamp 396. The discharge radiation passes transversally through the optical fiber 394 to the phosphor plate 398. To reduce the thickness of the display, the discharge lamp 396 can illumine the phosphor plate 398 by way of a side-emitting optical fiber.

The phosphor plate 398 can use a standard pixel layout 300, as shown in FIG. 15, or a preferred pixel layout 330 of FIG. 16. Alternatively, the phosphor plate 398 can be formed of multi-color luminescent material.

FIGS. 23–26 provide perspective views of an example of an optical display panel. FIGS. 23 and 26 show an overall configuration of the optical display panel. FIG. 26, while omitting detailed structural items for clarity, illustrates the principle of providing radiation to intersecting optical fibers 32 to illuminate the pixel 512 at the intersection of the optical fibers 32.

FIGS. 23–25 illustrate a phosphor plate 398 mounted between optical fibers 32 arranged to have notches 34 located at the intersections of the optical fibers 32. A luminescent material 36 is mounted between the notches 34. Optionally, the spacing of the optical fibers 32 oriented in the same direction can be increased or decreased. Although the luminescent material 36 is illustrated as individual pieces, one for each optical fiber 32 intersection, it is also possible to provide luminescent material 36 large enough to be mounted between multiple optical fiber 32 intersections, even covering the entire phosphor plate 398. In such a case, masking, such as black mask 338, discussed above in relation to FIGS. 15 and 16, is preferred. FIGS. 23–25 are progressive magnifications of the same example of an optical display panel.

Figure 19:
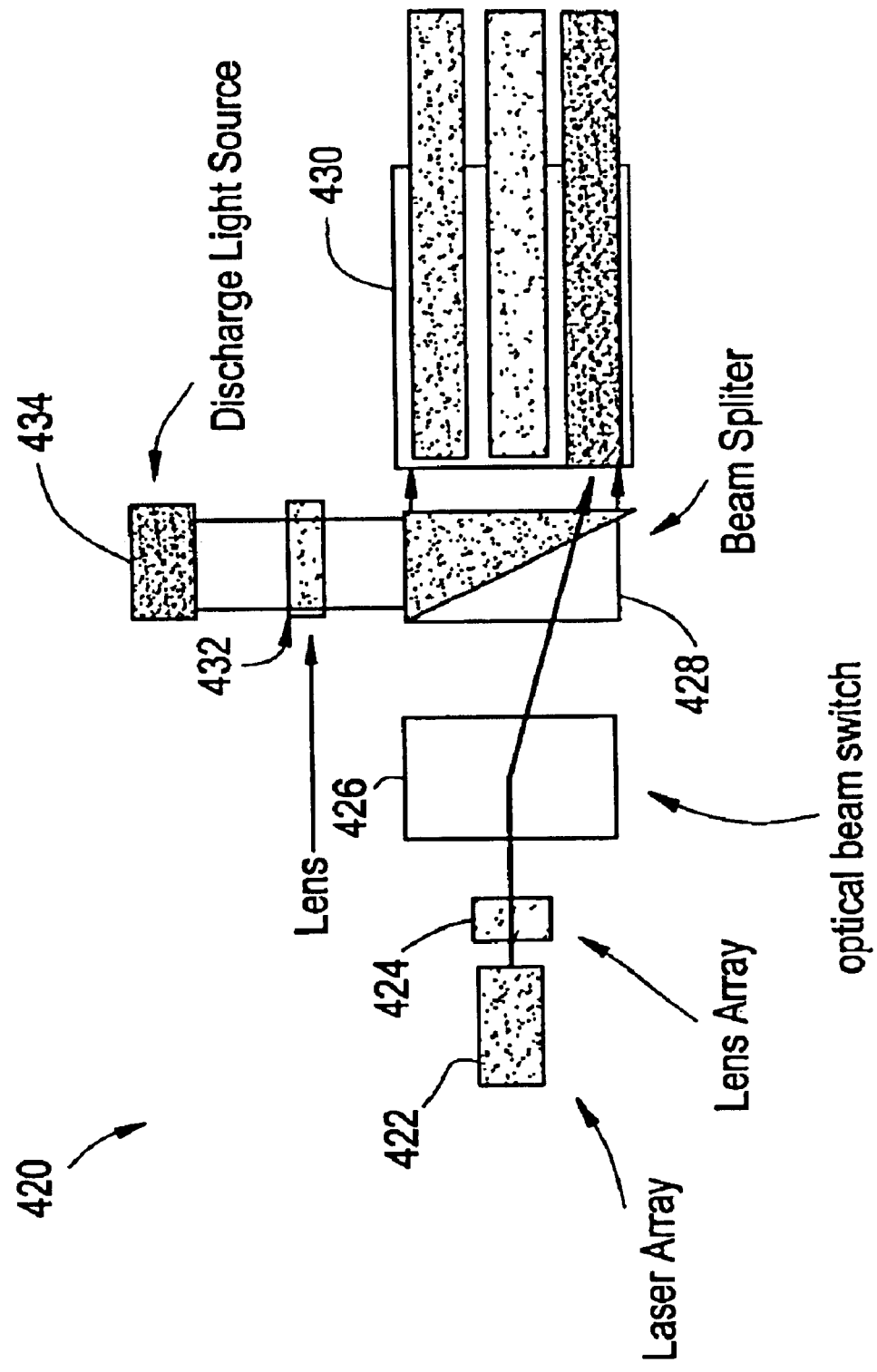
FIG. 19 shows an optical beam scan system for vertical or column scanning using a discharge lamp through an optical beam splitter to a whole fiber array or bundle. The mechanically rotated mirror or acoustics crystal device is suitable for an optical beam switch.

The ability to select the proper row and column so that their intersection is located at the desired location in the matrix is known in the art. The direction of the proper wavelengths of light into each of two optical fibers, such that the intersection of the two fibers occurs at the desired location in the optical display panel, may be performed using structures similar to those shown FIGS. 19–20C. FIG. 19 illustrates a radiation direction assembly 420. Radiation is provided by the laser array 422. The laser array 422 could produce UV light or IR light, or could be substituted with another radiation producing device. Ideally, the laser array 422 has an output of 30 to 40 W, but may also be of greater or lesser power. The lens array 424 focuses the radiation emitted from the laser array 422. The optical beam switch 426 directs the radiation to the proper optical fiber within the optical fiber bundle 430. Discharge radiation, capable of illuminating all the optical fibers within the optical fiber bundle 430 simultaneously, is provided by a discharge light source 434. The discharge radiation is provided through a lens 432 into a beam splitter 428. The beam splitter is arranged to provide radiation to multiple optical fibers within the optical fiber bundle 430.

Figure 20A:
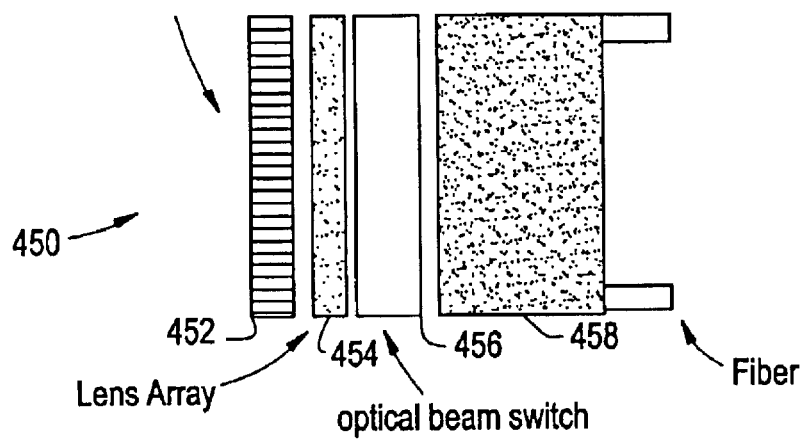
FIGS. 20A, 20B and 20C illustrate the coupling approach for optical power sources with an optical fiber bundle. The linear laser array is directly coupled to a linear fiber array and an optical beam switch device providing the switching function between the rows.
Figure 20B:
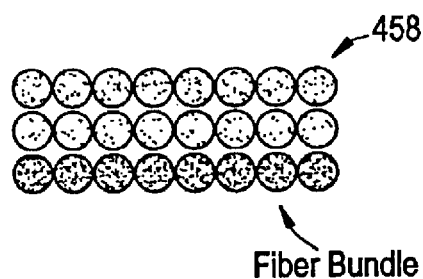
Figure 20C:
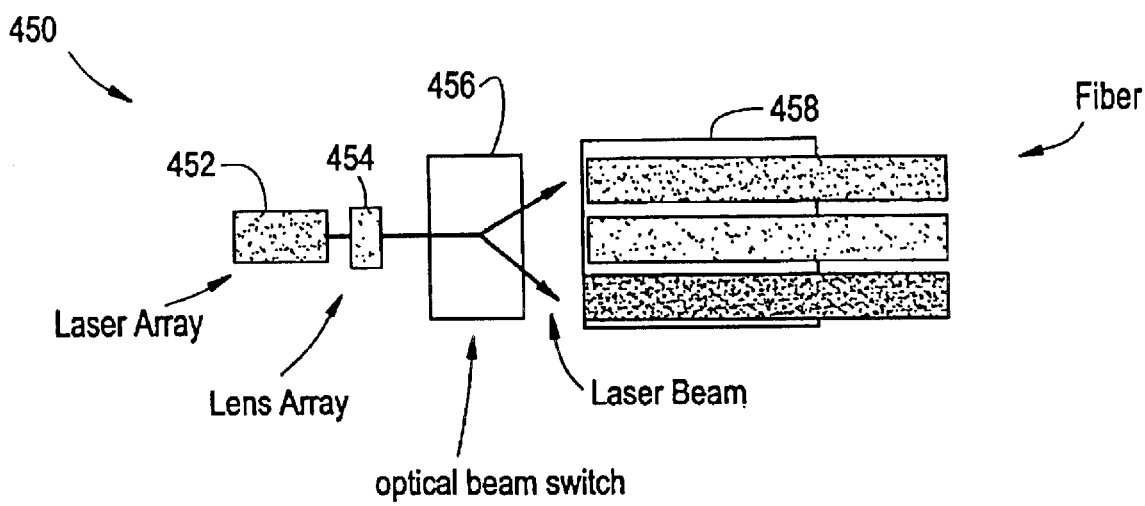

Ideally, a radiation direction assembly 450 can be used. FIGS. 20A and 20C illustrate this embodiment. In the radiation direction assembly 450, a linear laser array 452 is used to provide a plurality of radiation sources. Ideally, each of the emitters within the laser array 452 has an output of 30 to 40 W, but may also be of greater or lesser power. A lens array 454 and an optical beam switch 456 are also provided to focus and direct the radiation, respectively. The optical fiber bundle 458 can best be arranged, as shown by way of example in FIG. 20B, such that the optical fibers that make up the columns of the optical display panel and optical fibers that make up the rows of the optical display panel are provided in one bundle. This allows the optical display panel to be operated from a single optical fiber bundle 458 and a single radiation direction assembly 450, if desired.

Alternatively, a radiation direction assembly 450 can be provided for each axis of the optical display panel.

It is understood that multiple optical display panels can be used in close proximity to each other, each displaying only a portion of the entire desired image. Such a configuration allows for lower powered radiation sources and the use of luminescent materials with slower response times, e.g. requiring longer application times for sensitization, excitation, or discharge radiation.

Single illumination luminescent material, e.g., requiring only one type of radiation to cause it to emit visible light, may also be used as the basis for an optical display panel. A luminescent material possessing a logarithmic relationship between absorbed radiation and emitted visible light, as well as poor storage properties, would be most beneficial.

In photostimulable phosphors, typically known as 'ordinary' phosphors, electrons are excited by blue or UV light, electron bombardment in a CRT, or absorption of X-ray or other radiation and return slowly to the ground state, producing a sustained but slowly-decaying 'phosphorescence' after the exciting source is turned off. In phosphors of the type discussed below, however, the emission of light decays very quickly after the exciting source is turned off. The phosphor, however, remains in an activated, e.g. sensitized, state, and shining long-wavelength light on the phosphor while it is in the activated state will cause the phosphor to emit visible light. In the dark, the activated state of the phosphor may persist for quite a long time days or even weeks.

Most phosphors consist of trace quantities of so-called 'activator' or 'co-activator' substances distributed in a host lattice. In the case of the photostimulable phosphors discussed here, the host lattice is a wide-bandgap II–VI material, typically in alkaline-earth sulfide (MgS, CaS, or SrS). The 'activator' species is typically europium (as Eu++) and the 'co-activator' species is typically samarium (as Sm+++), both present at about 100 ppm concentration. These are added as chloride salts, and some of the chloride ion enters the lattice. Cl substituting for S— is believed to compensate the charge excess of Sm+++ substituting for M++ metal ion. The compositions are designated as host: (activators), e.g., SrS:(Sm, Eu).

By way of example, consider a 15" optical display panel with a display area of about 700 cm^2. If 1 W of blue photons are available to excite the phosphor, and the overall efficiency of excitation is 50%, then a surface brightness of a few hundred mLambert is likely achievable at somewhat greater than the typical brightness of a CRT display, requiring an IR flux of nearly 10 W.

Regarding specific storage phosphors with RGB characteristics for display applications, the generic phosphors include alkaline earth chalcogenides. Typical phosphors of this type include magnesium, calcium, strontium and barium sulfides. They are activated and sensitized with co-dopants which can trap electrons at shallow levels below the conduction band with subsequent infrared stimulation inducing radiative recombination processes, i.e., emission of light. Typically, these storage phosphor materials have not found application in display applications. However, singly-doped materials have been used in electroluminescent display applications.

The display panel of the present invention is entirely optical and can be separate from the light sources, such as laser, LED or lamp, providing excitation. The display panel may connect to the electro-optical module via a flexible fiber optics cable. Because it is all-optical, a display panel of this type is expected to be especially rugged and will be able to operate in certain environments where electronic devices cannot be used. Also, the display panel will not have electronics part built in, such as TFT transistor, pixel drivers, electrode and line or column electrical wire. There is no high-voltage, no electromagnetic radiation, no EMI from the display panel. Due to the simple construction of a display panel of this type, the cost of manufacture is expected to be significantly lower than that of competitive display technologies.

The present invention has been described by way of example, and modifications and variations of the exemplary embodiments will suggest themselves to skilled artisans in this field without departing from the spirit of the invention. The preferred embodiments are merely illustrative and should not be considered restrictive in any way. The scope of the invention is to be measured by the appended claims, rather than the preceding description, and all variations and equivalents which fall within the range of the claims are intended to be embraced therein.

What is claimed is:

1. An optical luminescent display device, adapted for use with radiant energy source, comprising:

an optical fiber;

a luminescent material;

a notch formed in said optical fiber adapted to direct a first type of radiant energy within said optical fiber toward the luminescent material; and a reflective coating mounted on said optical fiber transversally opposite from said notch.

2. An optical luminescent display device of claim 1, wherein:

said luminescent material requires excitement from a first type of radiant energy to emit visible light.

3. An optical switch, comprising:

an optical fiber;

a luminescent material;

a notch formed in said optical fiber adapted to direct a first type of radiant energy within said optical fiber toward said luminescent material; and an optical pickup arranged to optically communicate with said luminescent material.

* * * * *